(12) United States Patent
Davis et al.

(10) Patent No.: US 6,868,932 B1
(45) Date of Patent: Mar. 22, 2005

(54) MODULAR VEHICLE DRIVETRAIN

(75) Inventors: Richard A. Davis, Mequon, WI (US); Eric A. Davis, Mequon, WI (US); Brian P. Davis, Mequon, WI (US)

(73) Assignee: American Off-Road Technologies, LLC, Mequon, WI (US)

( * ) Notice: Subject to any disclaimer, the term of this patent is extended or adjusted under 35 U.S.C. 154(b) by 0 days.

(21) Appl. No.: 09/981,246

(22) Filed: Oct. 16, 2001

Related U.S. Application Data

(63) Continuation-in-part of application No. 09/217,264, filed on Dec. 21, 1998, now Pat. No. 6,343,669.

(51) Int. Cl.$^7$ .............................................. B60K 17/22
(52) U.S. Cl. ...................... 180/292; 180/233; 180/376
(58) Field of Search ................................ 180/233, 247, 180/251, 291, 292, 215, 374, 908, 376, 21, 299

(56) References Cited

U.S. PATENT DOCUMENTS

| | | | |
|---|---|---|---|
| 2,879,859 A | | 3/1959 | Swisher |
| 2,891,370 A | * | 6/1959 | Musgrave .................... 56/14.7 |
| 3,480,156 A | * | 11/1969 | Pensa .......................... 212/289 |
| 3,613,815 A | | 10/1971 | Meylink |
| 3,939,720 A | | 2/1976 | Aaen et al. |
| 4,118,996 A | | 10/1978 | Eichinger |
| 4,449,606 A | * | 5/1984 | Buschbom et al. ......... 180/297 |
| 4,630,719 A | | 12/1986 | McCormick |
| 4,666,015 A | | 5/1987 | Matsuda et al. |
| 4,679,682 A | | 7/1987 | Gray, Jr. et al. |
| 4,699,234 A | | 10/1987 | Shinozaki et al. |
| 4,714,126 A | * | 12/1987 | Shinozaki et al. .......... 180/233 |
| 4,836,324 A | | 6/1989 | Morita et al. |
| 4,869,121 A | | 9/1989 | Meisenburg |
| 4,887,420 A | * | 12/1989 | Cerny et al. ................ 56/320.2 |
| 4,914,894 A | * | 4/1990 | Geiger ........................ 56/14.7 |
| 4,952,181 A | | 8/1990 | Entringer et al. |
| 5,036,939 A | | 8/1991 | Johnson et al. |
| 5,467,839 A | | 11/1995 | Yoshio |
| 5,678,649 A | * | 10/1997 | Minoura et al. ............ 180/68.3 |
| 5,699,872 A | | 12/1997 | Miyakawa et al. |
| 5,791,431 A | | 8/1998 | Asao et al. |
| 6,062,360 A | | 5/2000 | Shields |
| 6,095,937 A | | 8/2000 | Aaen |
| 6,182,784 B1 | | 2/2001 | Pestotnik |
| 6,230,836 B1 | * | 5/2001 | Cowan et al. ............... 180/118 |
| 6,343,669 B2 | * | 2/2002 | Davis et al. ................. 180/376 |

* cited by examiner

*Primary Examiner*—Anne Marie Boehler
(74) *Attorney, Agent, or Firm*—Andrus, Sceales, Starke & Sawall, LLP

(57) ABSTRACT

A vehicle drivetrain (110) includes an engine (122) with a vertical crankshaft (124), a first transmission (126) below the engine and driven by the crankshaft, a second transmission (128) above the first transmission and horizontally adjacent the engine and having an input driven by the first transmission and having an output providing vehicle propulsion. A module pre-assembled unit is ready for drop-in mounting to a vehicle.

10 Claims, 21 Drawing Sheets

MODULAR VEHICLE DRIVETRAIN

CROSS-REFERENCE TO RELATED APPLICATION

This application is a continuation-in-part of commonly owned U.S. patent application Ser. No. 09/217,264, filed Dec. 21, 1998, now U.S. Pat. No. 6,343,669.

BACKGROUND AND SUMMARY

Parent Invention

The invention of the above-noted parent application relates to ATVs, all terrain vehicles, and more particularly to improvements enabling manufacturing cost advantages. ATVs are known in the art, and have grown in popularity, not only for recreational, but also for various functional purposes. An ATV has a straddle seat, and at least four oversized balloon tires, to overcome prior objections to three wheel ATVs. The ATV has a frame with front and rear suspensions respectively mounting the large tires and allowing sufficient travel to accommodate rough terrain. The parent invention provides a packaging construction providing a manufacturing cost advantage by enabling the use of a mass-produced economical industrial engine in an ATV. In the ATV configuration of the parent invention, a vertical crankshaft is used, which in turn enables usage of the noted mass-produced economical industrial vertical crankshaft engine, such as produced by mass manufacturers such as Kohler, Briggs & Stratton, Tecumseh, and the like. The parent invention enables usage of two cycle or four cycle engines, air cooled or water cooled. The vertical crankshaft in an ATV further enables positioning of the cooling air inlet high on the vehicle, minimizing intrusion of water into the cooling system. Another advantage is that the power take-off shaft can be neatly packaged below the vehicle, maximizing operator safety. Power take-off devices can be attached in a maximally effective plane, namely horizontal. The vertical crankshaft in combination with various power take-off devices, such as pulleys, constant velocity, CV, transmissions or gear devices can be utilized while maximizing packaging efficiency. In a further aspect, the engine fits between the fame rails of the ATV, allowing a narrower package, and minimizing vibration propagation.

PRESENT INVENTION

The present invention arose during further development efforts relating to the above-noted parent invention.

The present invention relates to drivetrains for various vehicle applications, including ATVs. In one particularly desirable aspect, the invention provides a modular pre-assembled unit ready for drop-in mounting to a vehicle, and providing a drivetrain for the vehicle.

BRIEF DESCRIPTION OF THE DRAWINGS

Parent Invention

FIG. 1 is a side schematic elevation view of an ATV constructed in accordance with the parent invention.

FIG. 2 is a top schematic elevation view of the ATV of FIG. 1.

FIG. 3 is a view like FIG. 2 and shows an alternate embodiment.

FIG. 4 is a side schematic elevation view of the ATV of FIG. 3.

FIG. 5 is a view like FIG. 3 and shows an alternate embodiment.

FIG. 6 is a side schematic elevation view of the ATV of FIG. 5.

FIG. 7 is a view like FIG. 5 and shows an alternate embodiment.

FIG. 8 is a view like FIG. 1 and shows an alternate embodiment

FIG. 9 is a top schematic elevation view of the ATV of FIG. 8.

FIG. 10 is a view like FIG. 1 and shows an alternate embodiment.

FIG. 11 is a top schematic elevation view of the ATV of FIG. 10.

Present Invention

Figure 12:
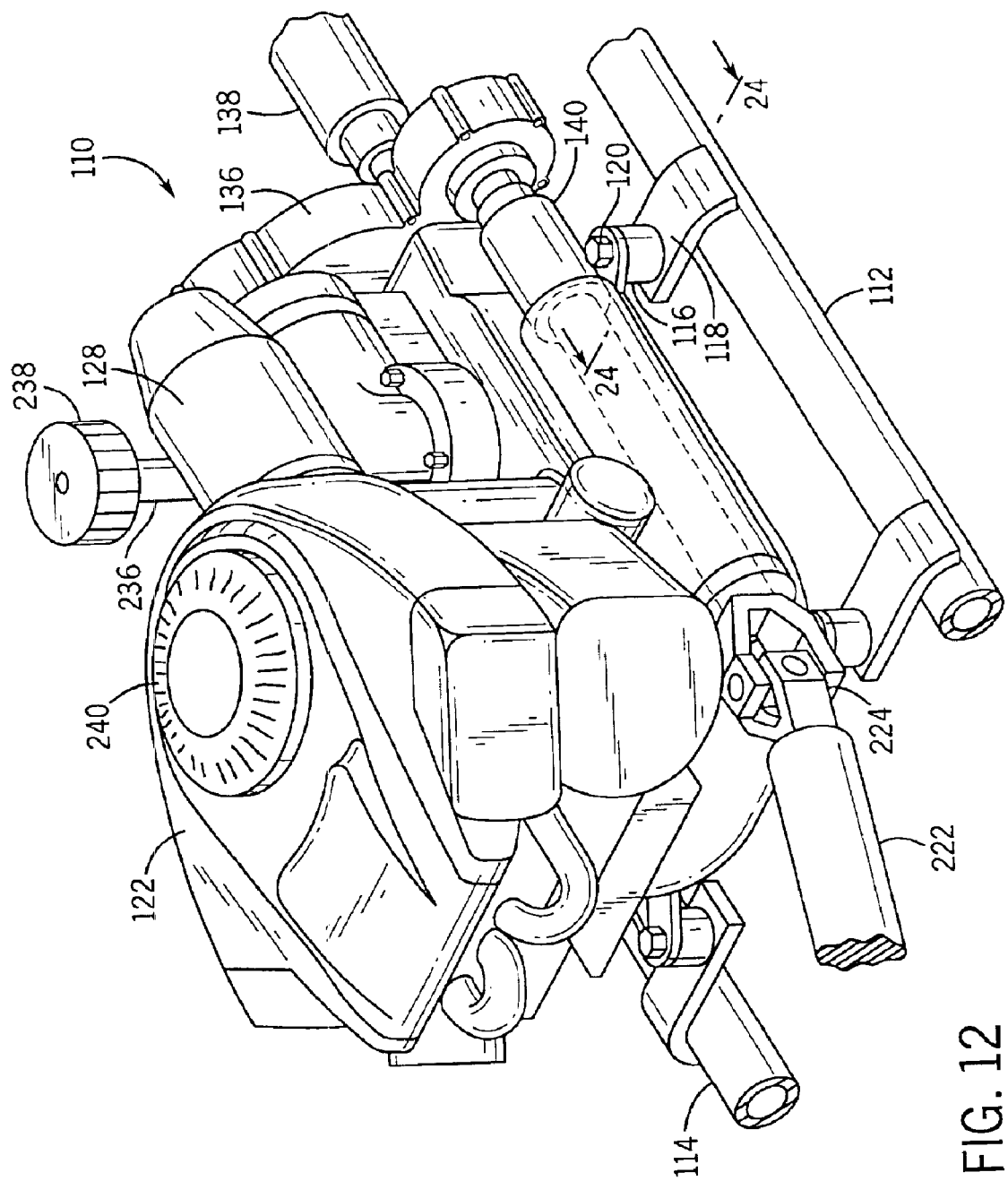

FIG. 12 is an isometric view of a vehicle drivetrain in accordance with the present invention.

Figure 13:
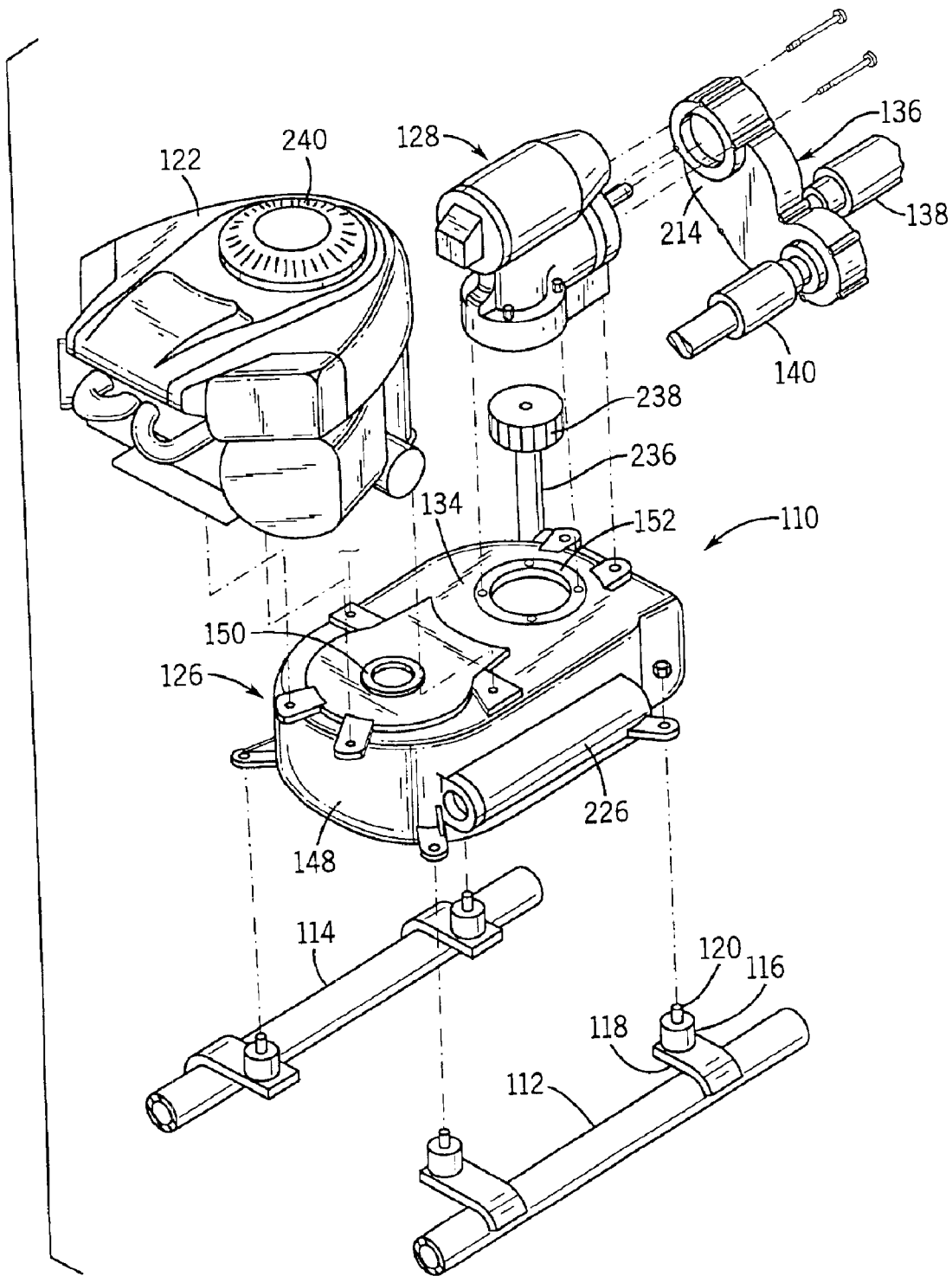

FIG. 13 is an exploded isometric view of the construction of FIG. 12.

Figure 14:
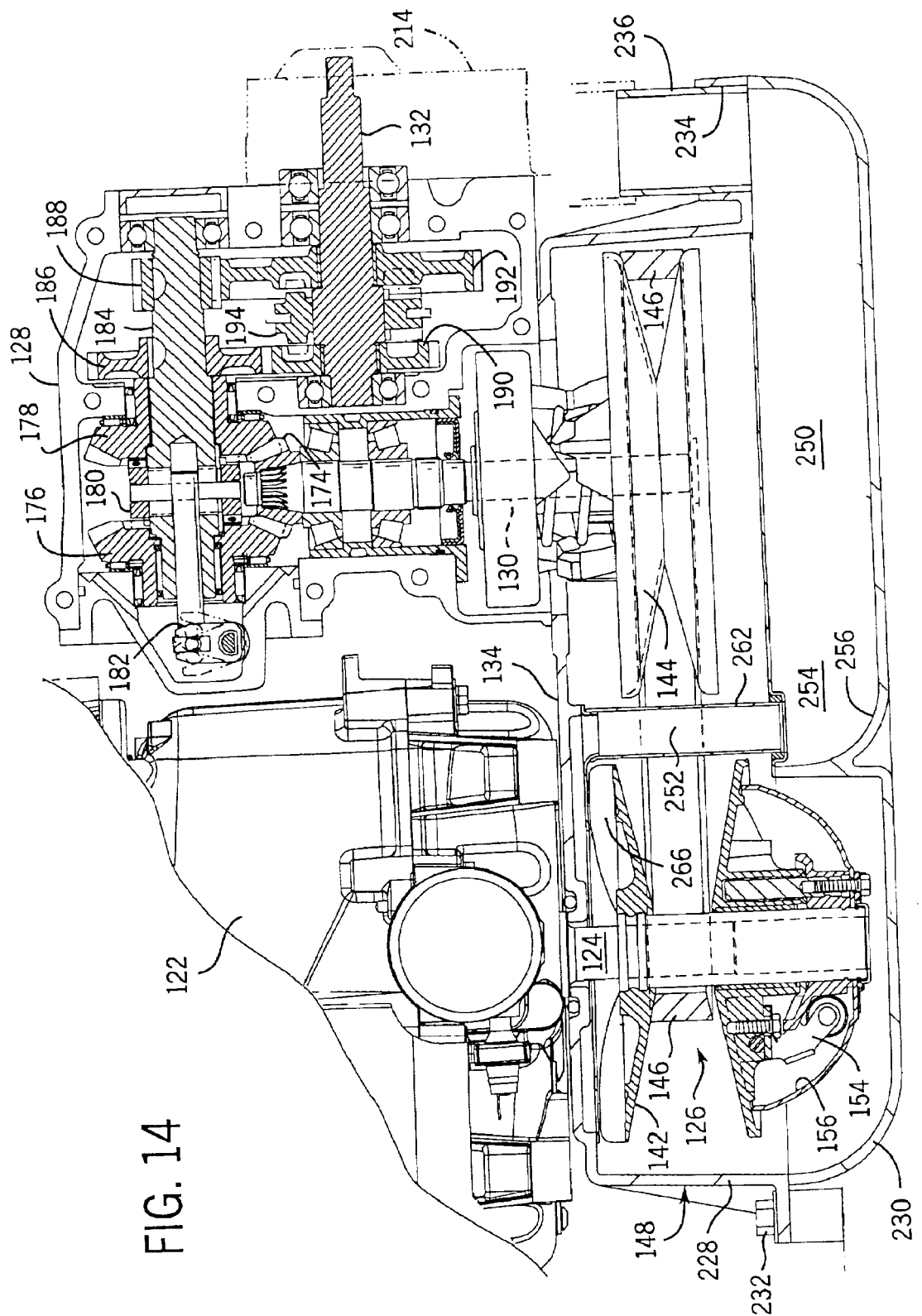

FIG. 14 is a side sectional view of a portion of the construction of FIG. 12.

Figure 15:
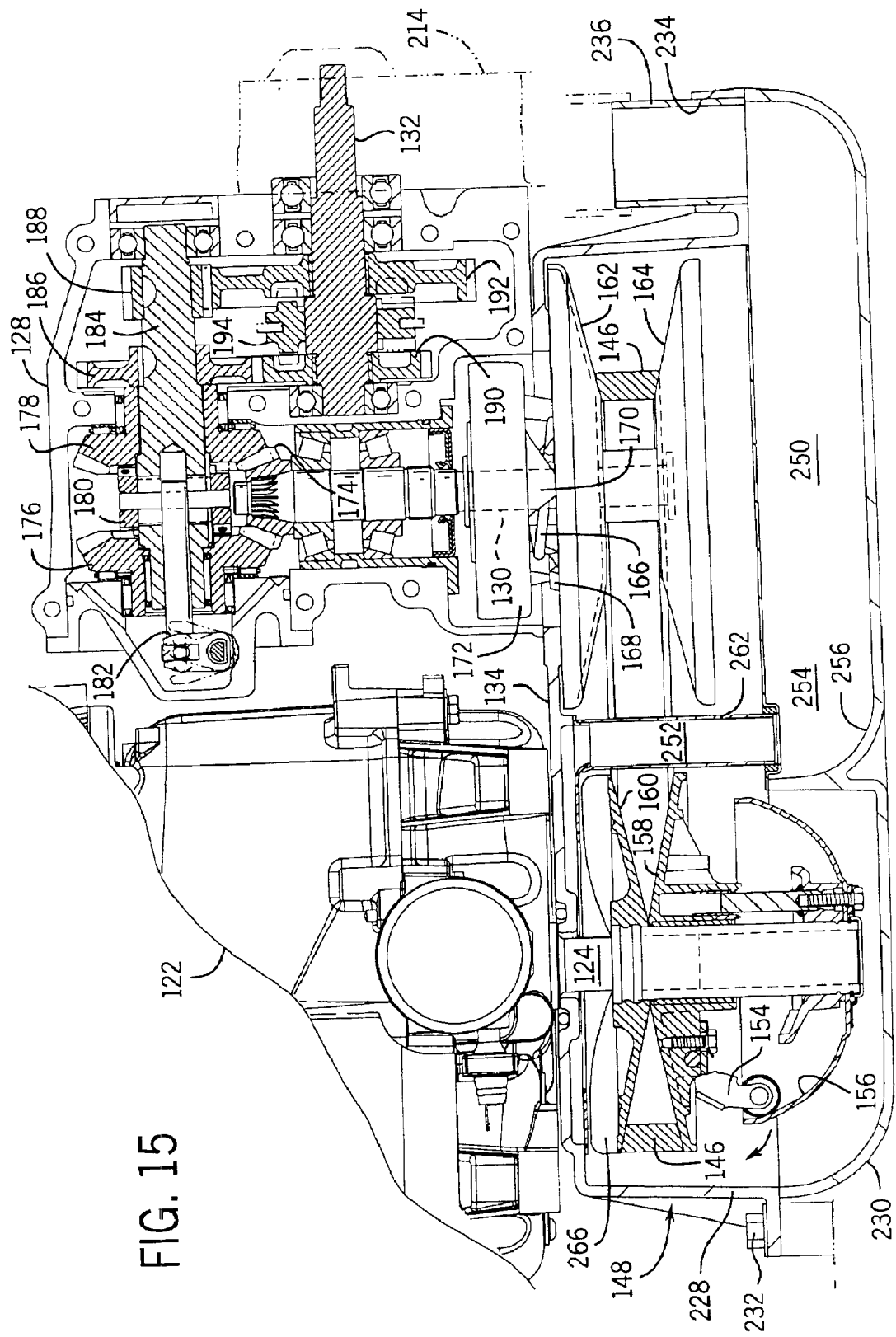

FIG. 15 is like FIG. 14 and further illustrates operation.

Figure 16:
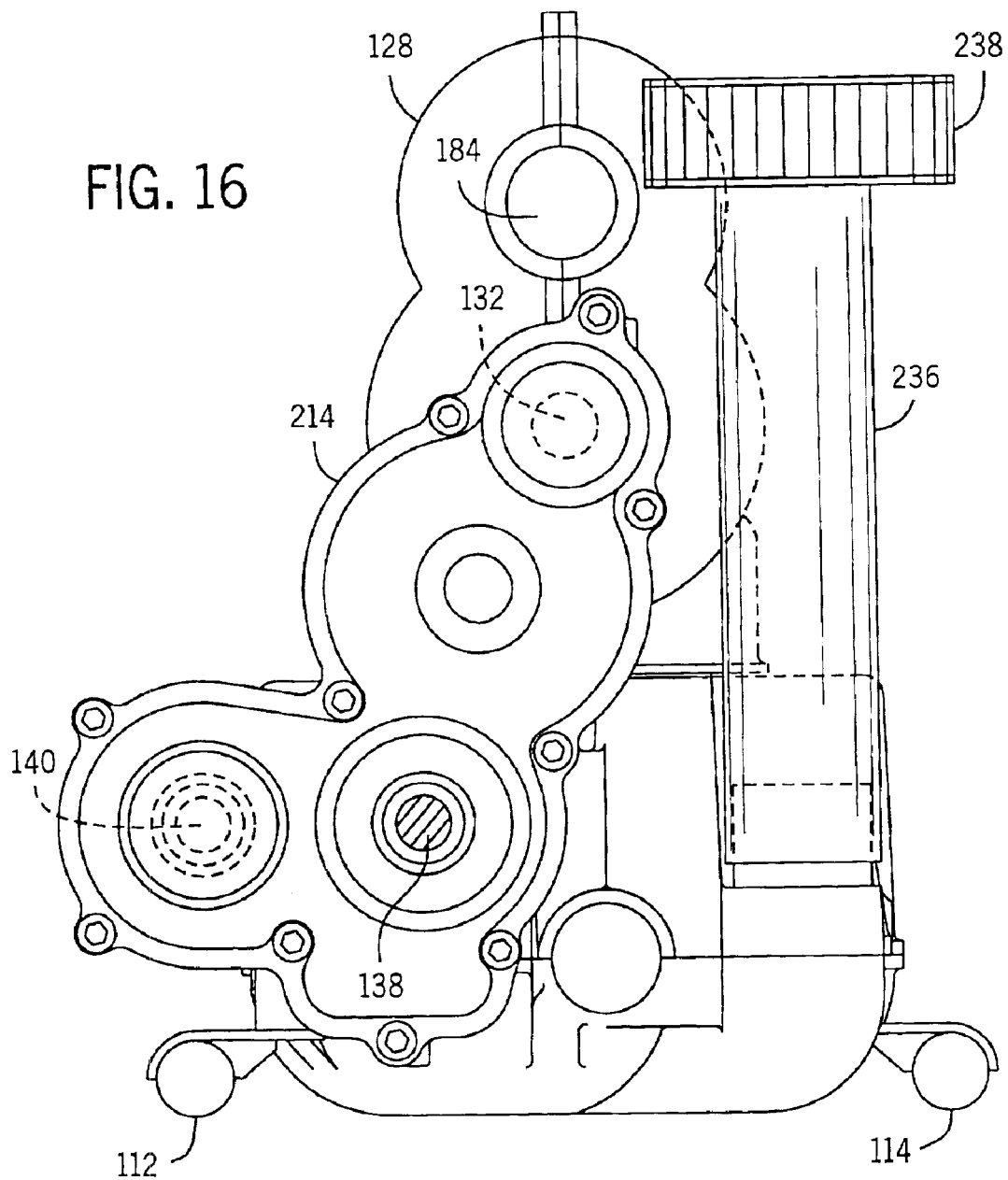

FIG. 16 is an end view of the construction of FIG. 12.

Figure 17:
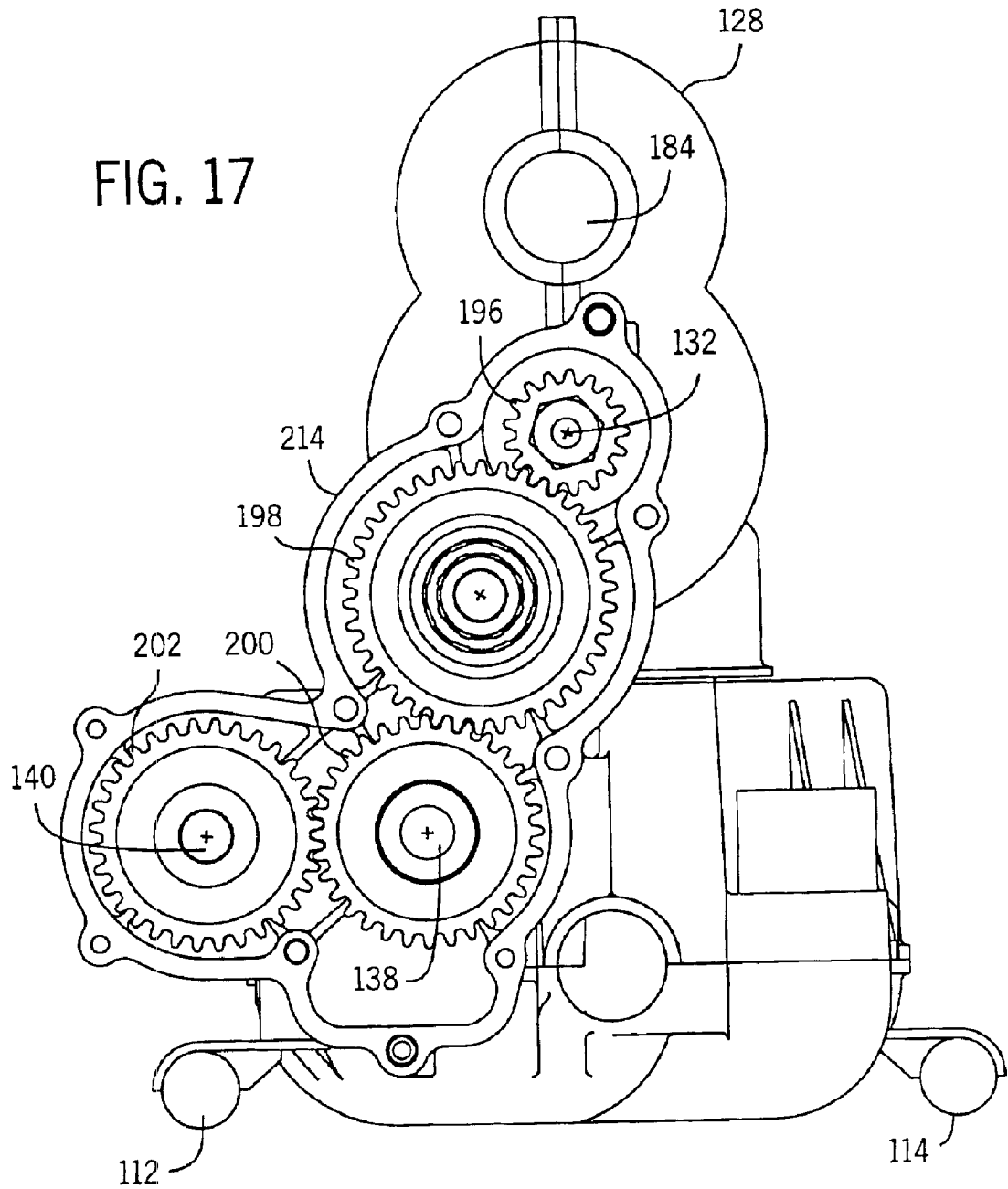

FIG. 17 is like FIG. 16 with portions removed.

Figure 18:
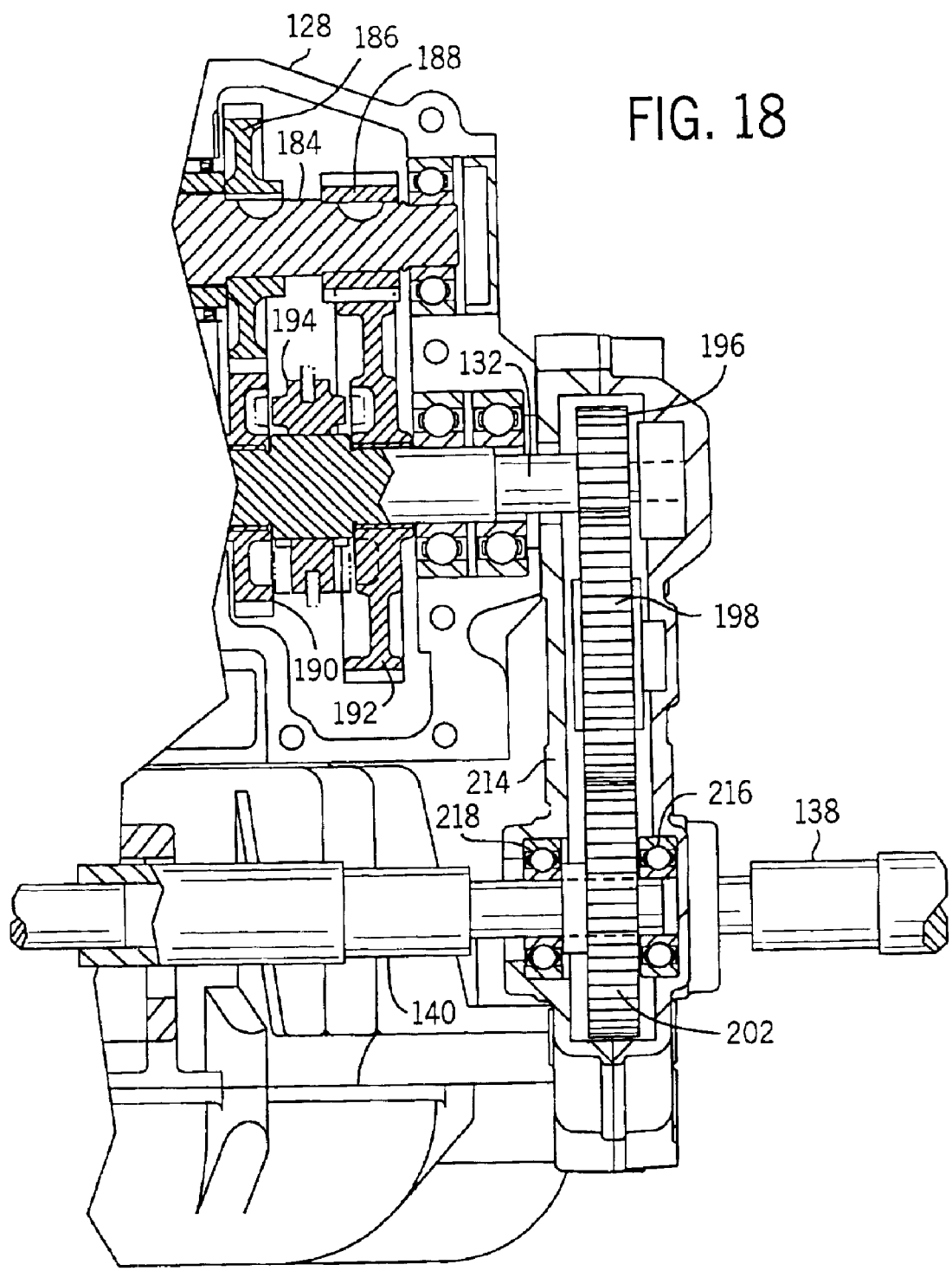

FIG. 18 is a side sectional view of the construction of FIG. 17.

Figure 19:
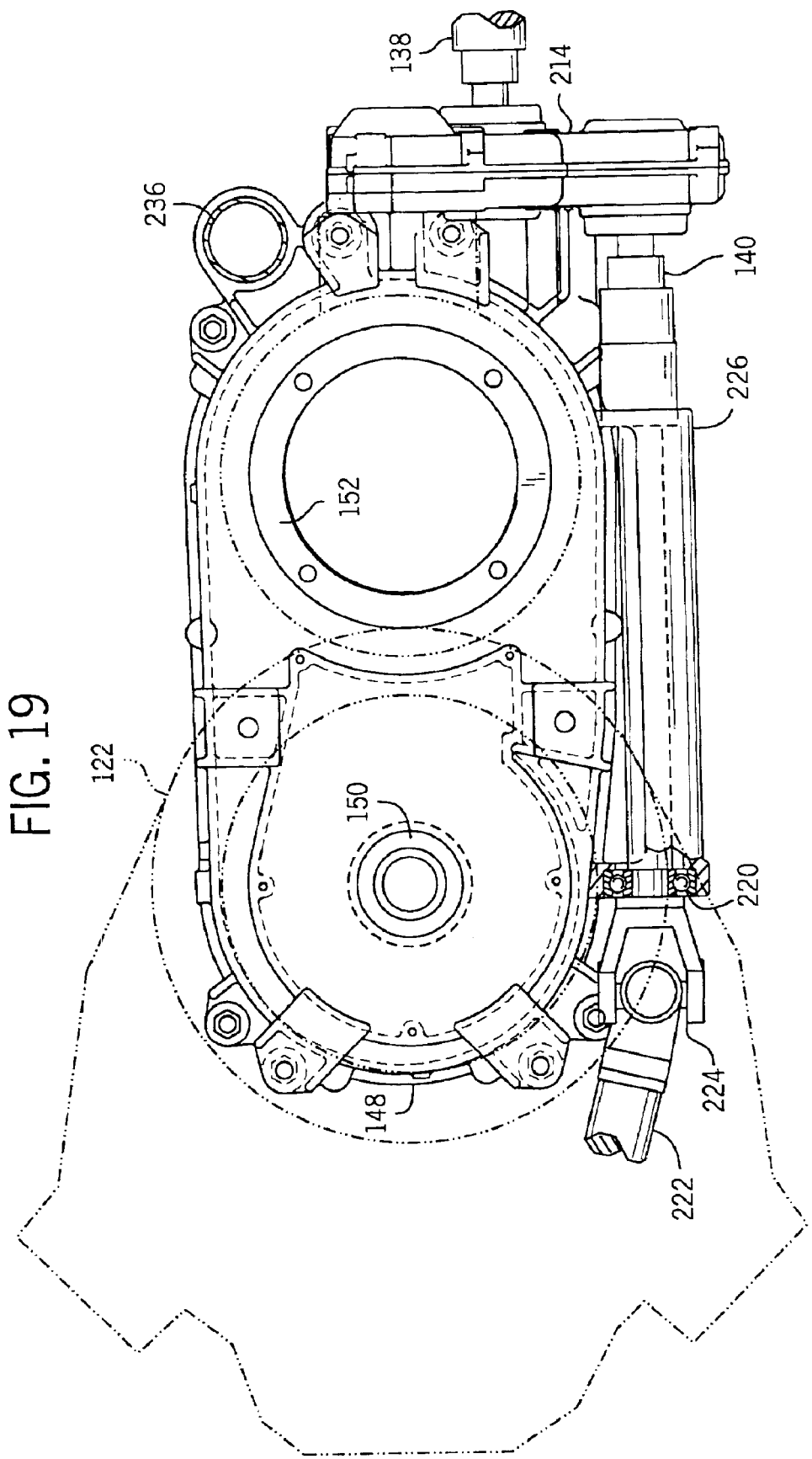

FIG. 19 is a top view of the construction of FIG. 12 with portions removed.

Figure 20:
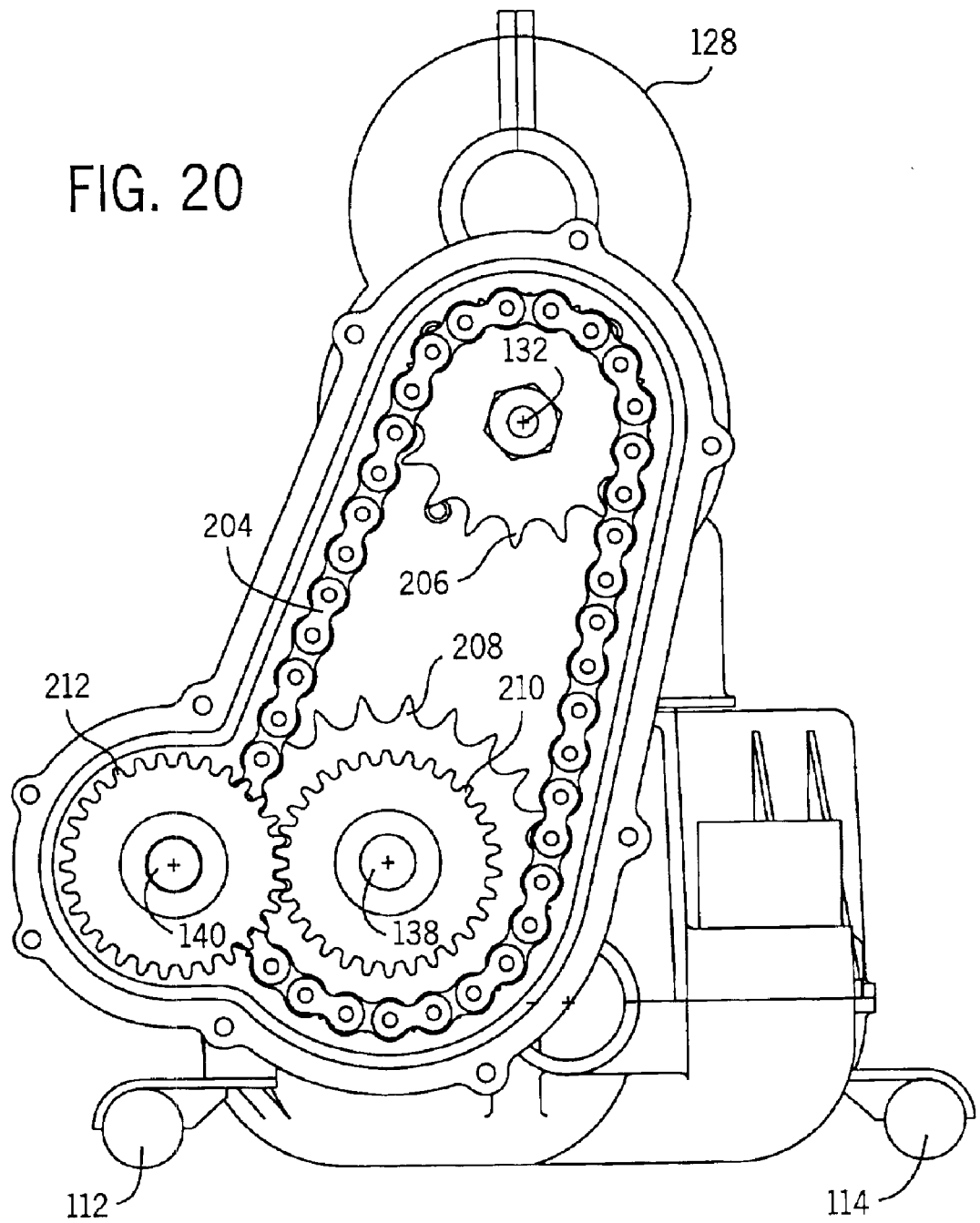

FIG. 20 is like FIG. 17 and shows an alternate embodiment.

Figure 21:
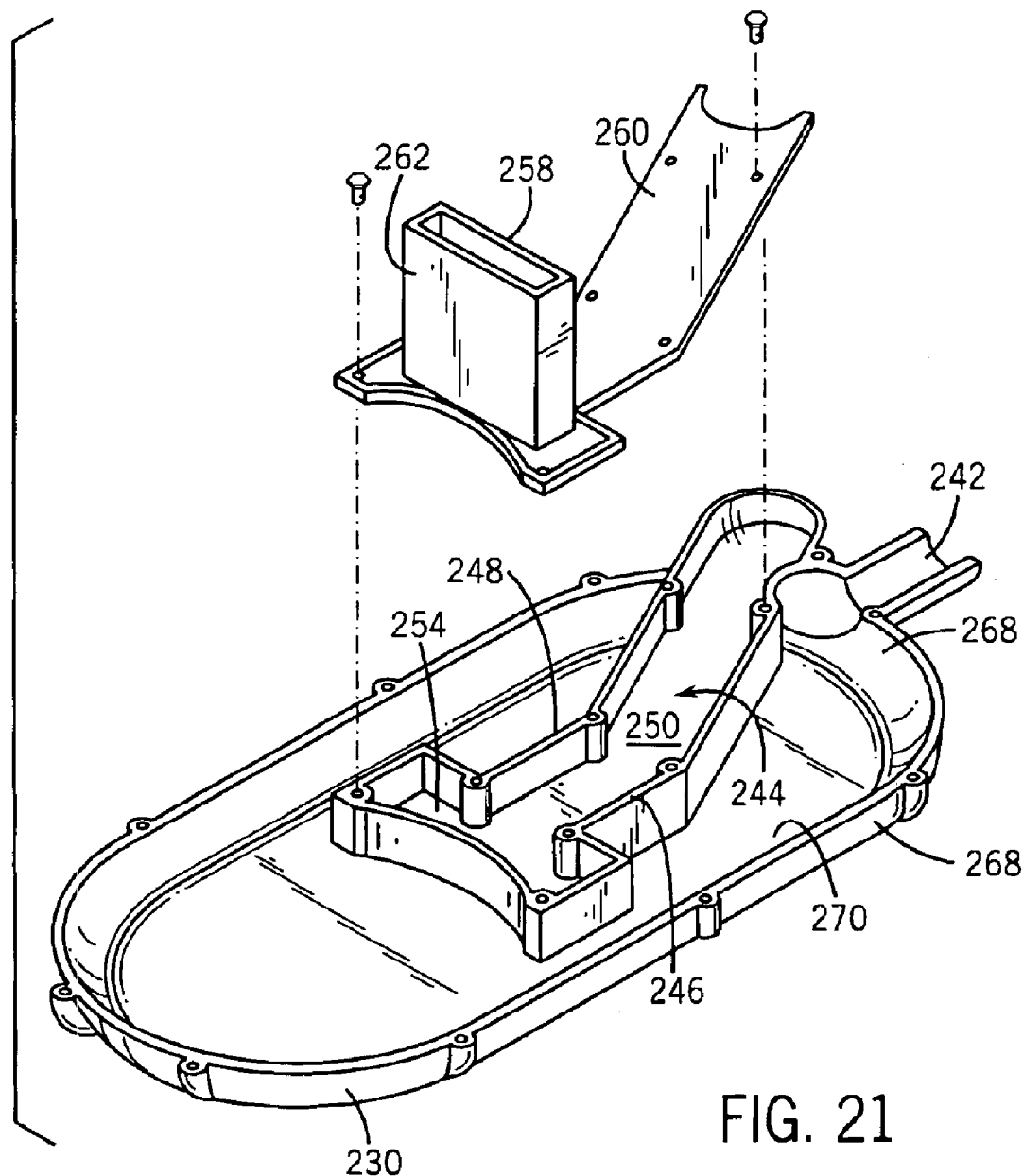

FIG. 21 is an exploded isometric view of a portion of a component of FIG. 13.

Figure 22:
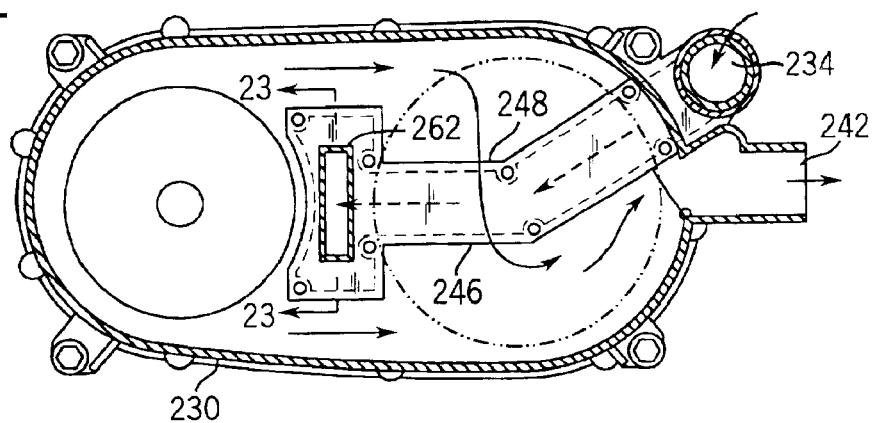
Figure 25:
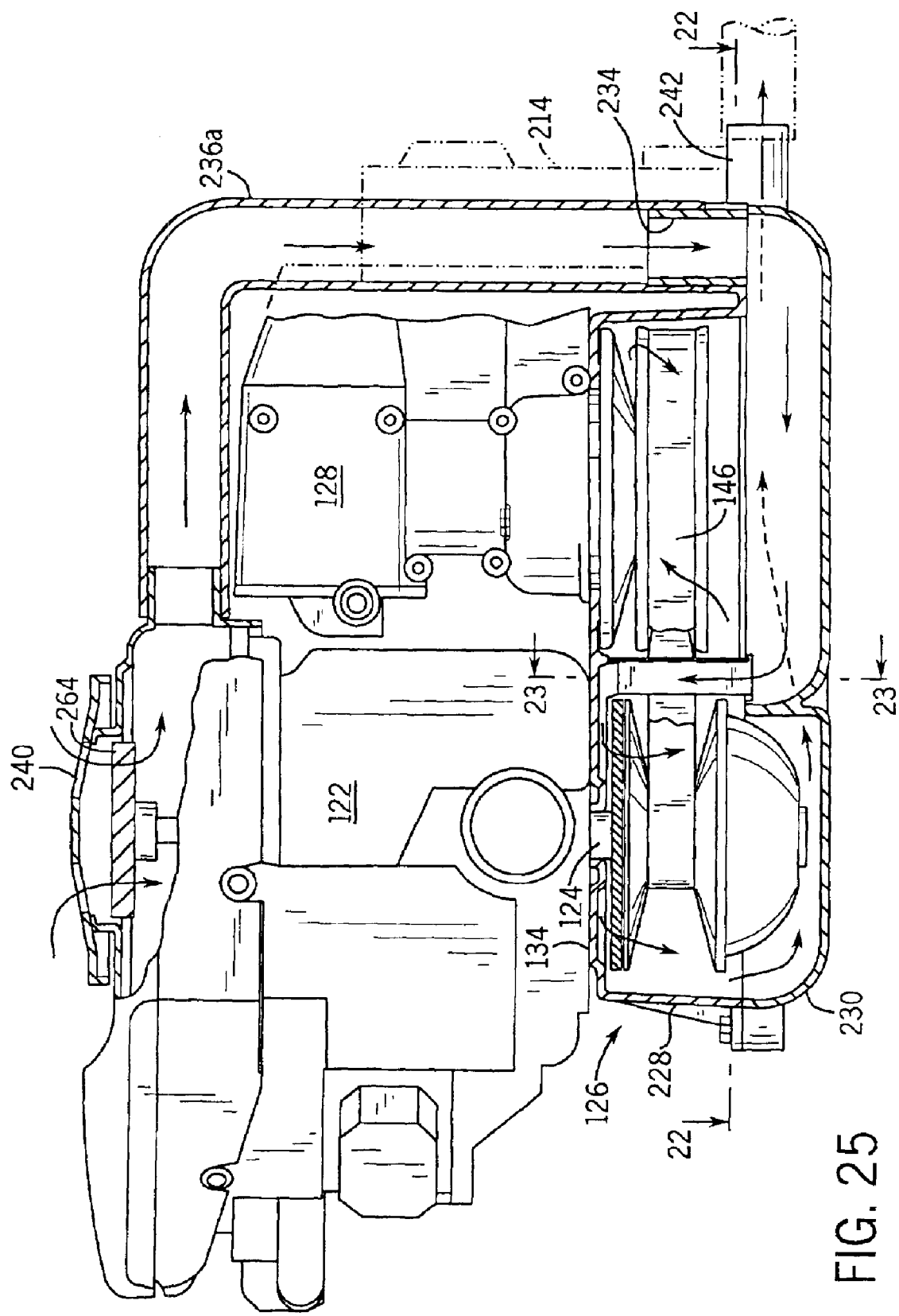

FIG. 22 is a top view partially in section of the construction of FIG. 21 and is taken along line 22—22 of FIG. 25.

Figure 23:
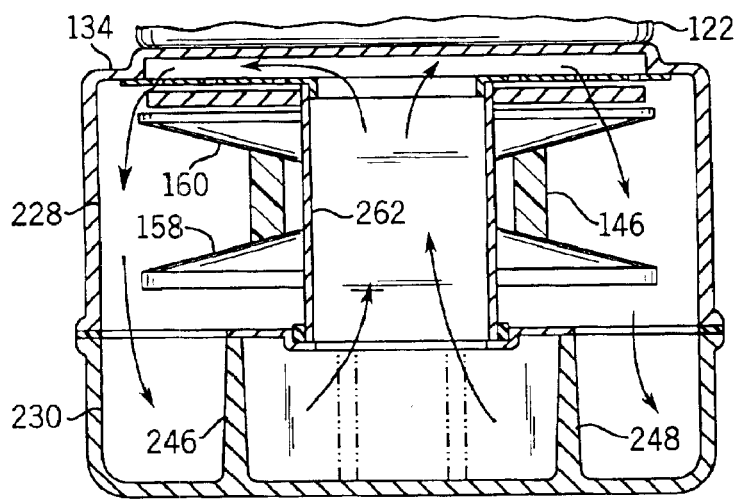

FIG. 23 is a sectional view taken along lines 23—23 of FIGS. 22 and 25.

Figure 24:
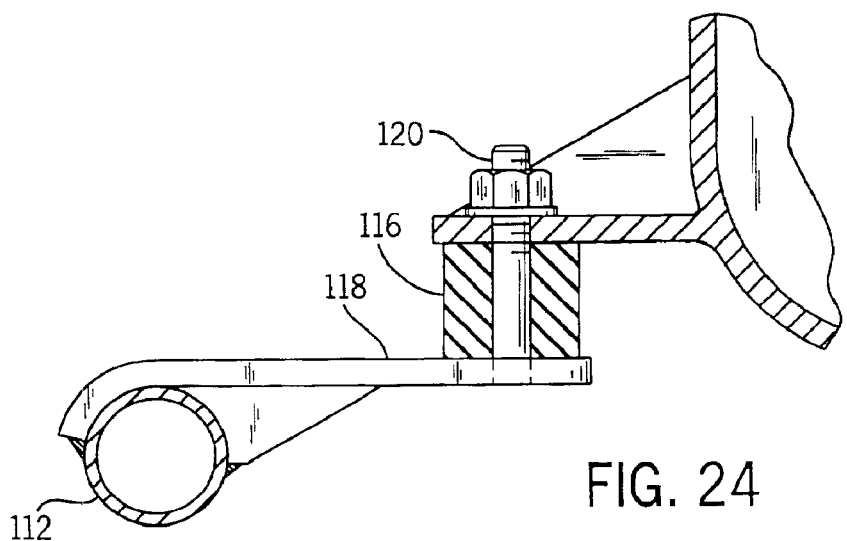

FIG. 24 is a sectional view taken along line 24—24 of FIG. 12.

FIG. 25 is a side view partially in section of FIG. 12 and showing an alternate embodiment.

Figure 26:
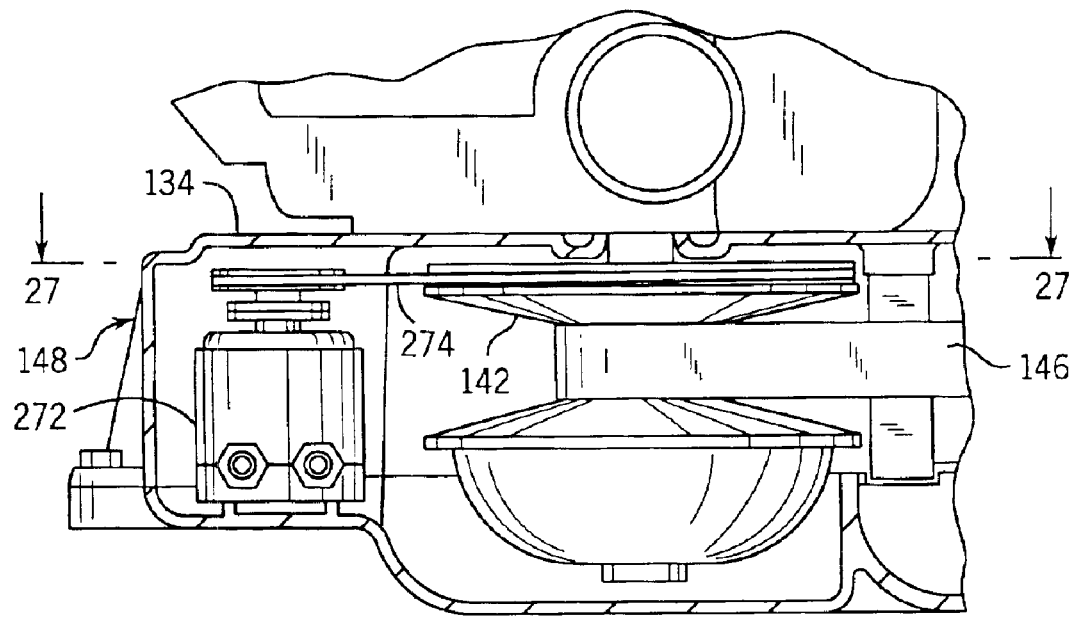

FIG. 26 is a side view like a portion of FIG. 25 and showing a further alternate embodiment.

Figure 27:
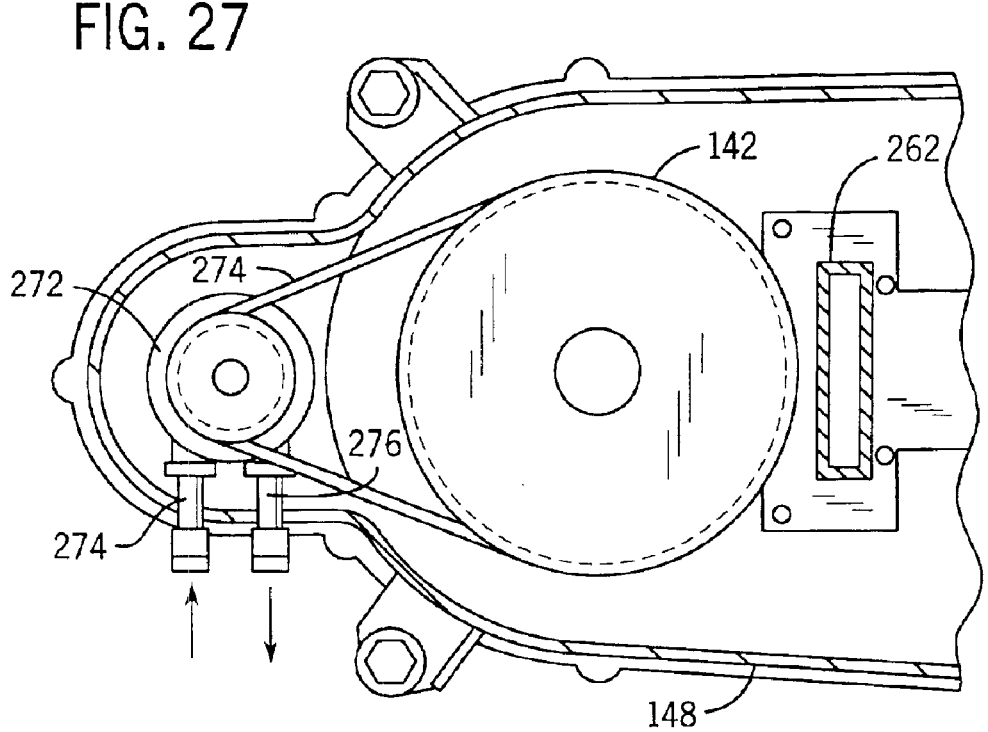

FIG. 27 is a sectional view taken along line 27—27 of FIG. 26.

Figure 28:
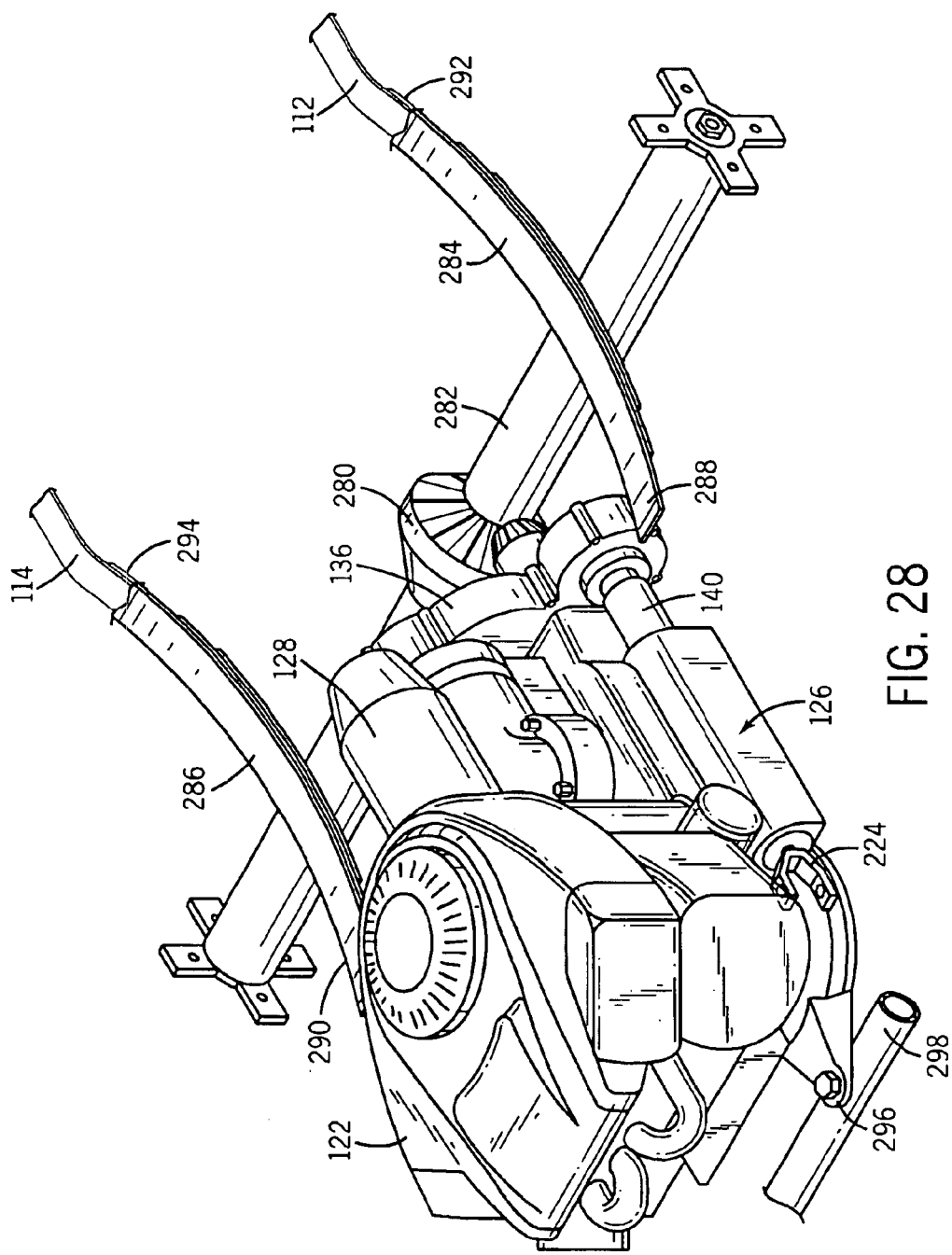

FIG. 28 is an isometric view like FIG. 12 and shows a further embodiment.

Figure 29:
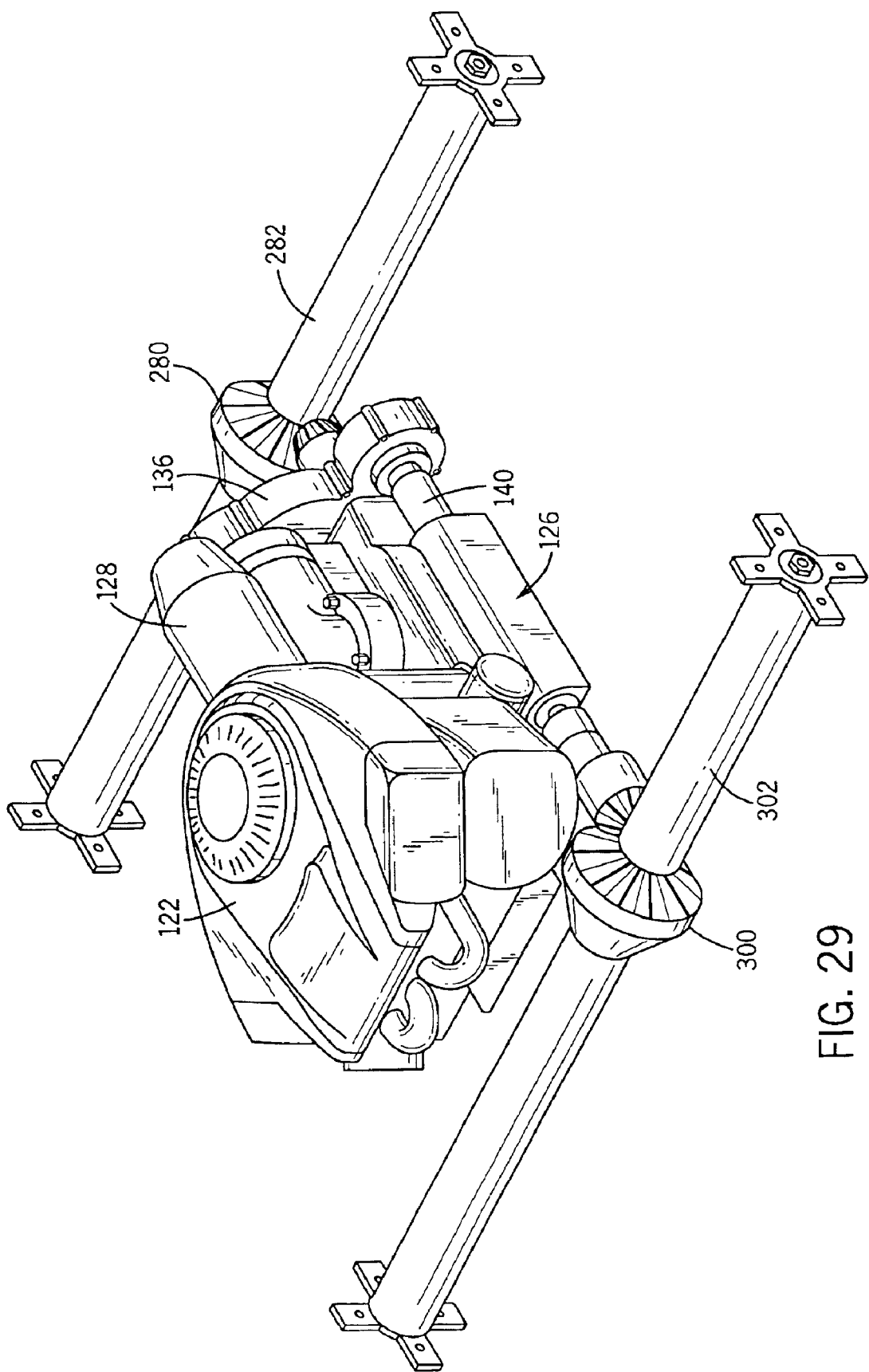

FIG. 29 is an isometric view like FIG. 12 and shows a further embodiment.

DETAILED DESCRIPTION

Parent Invention

Figure 1:
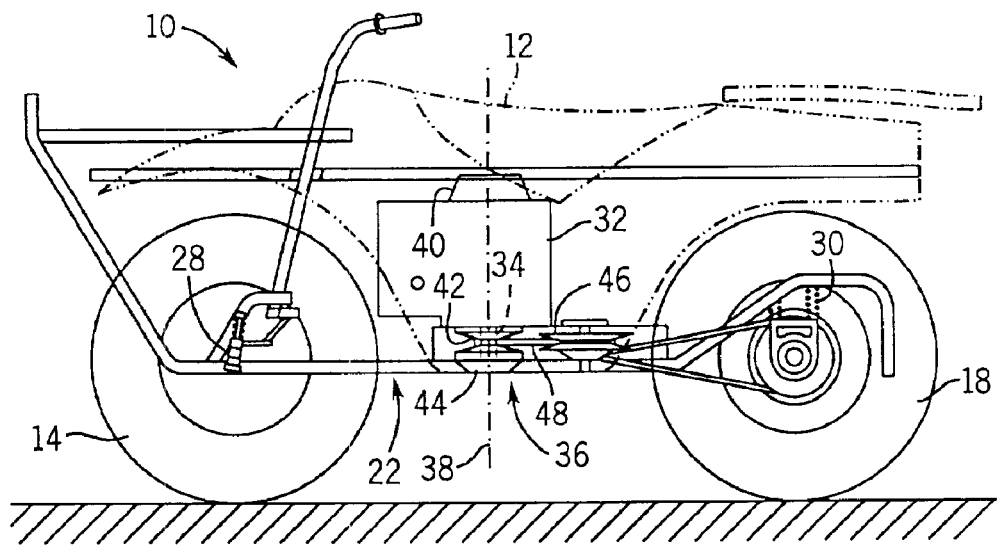
FIGS. 1–11 are taken from the noted commonly owned copending parent U.S. patent application Ser. No. 09/217,264, filed Dec. 21, 1998.

FIG. 1 shows an ATV 10, all terrain vehicle, having straddle seating at seat 12, i.e. the operator sits on seat 12, with his/her legs straddling same. The ATV includes at least four oversized balloon tires 14, 16, 18, 20, FIGS. 1 and 2. The ATV includes a frame 22 with left and right side rails 24, 26, and front and rear suspensions 28, 30 respectively mounting the tires. An engine 32 is mounted on the frame between the left and right side rails and between the front and rear suspension and has a vertical crankshaft 34. Engine 32 is preferably purchased from a mass manufacturer such as Kohler, Briggs and Stratton, Tecumseh, or the like, and typically ranges from 3 to 22 horsepower.

ATV 10 includes a lower power take-off drive member 36 below the engine and rotating in a horizontal plane about a vertical axis 38. Engine 32 has an upper cooling air inlet 40 above the axes of rotation of the tires, and preferably at or above the tops of the tires. Power take-off drive member 36 includes a primary pulley 42 at the lower end of vertical crankshaft 34. A constant velocity clutch 44 is provided for engaging and disengaging the pulley. Pulley 46 is driven by pulley 42, and each pulley rotates in a coplanar horizontal plane. Pulley 46 is spaced below straddle seat 12 and vertically aligned therewith. Each pulley 42 and 46 is preferably at a level at or below the axes of rotation of the tires. Primary pulley 42 drives secondary pulley 46 by coplanar drive belt 48. Pulley 46 drives rear wheel tires 18 and 20 by V-belt 50 driving pulley 52 on rear axle 54. Axle 54 is a live axle, and ATV 10 is a two wheel drive vehicle. Front wheels 14 and 16 are connected by live axle 55. The vehicle is braked by disc brake 56 actuated by cable 58 from foot brake pedal 60 on foot rest 62. The brake may also be actuated from left foot rest 64.

Figure 2:
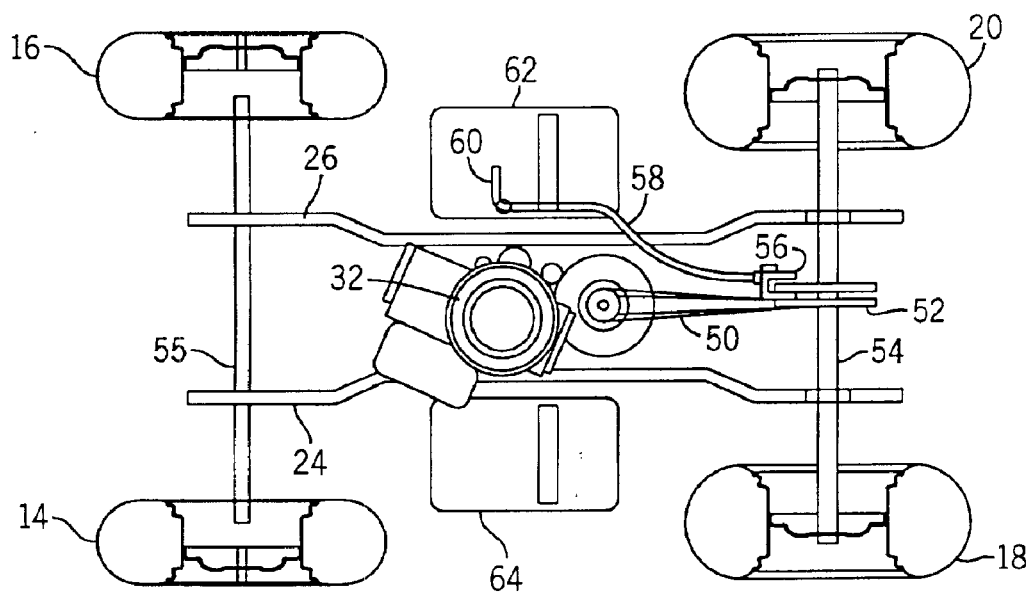
Figure 3:
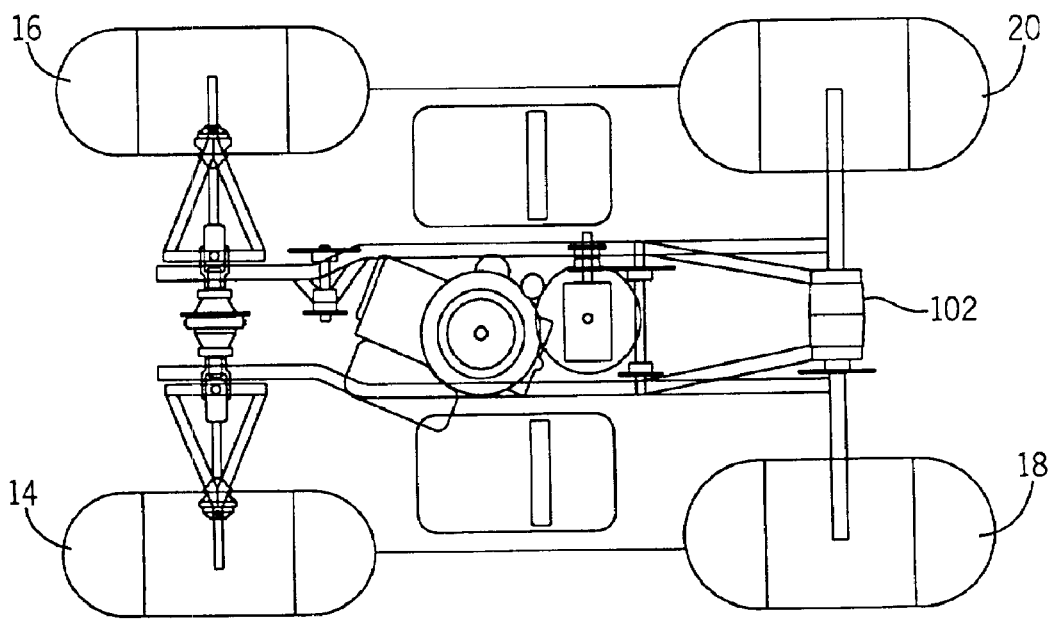
Figure 4:
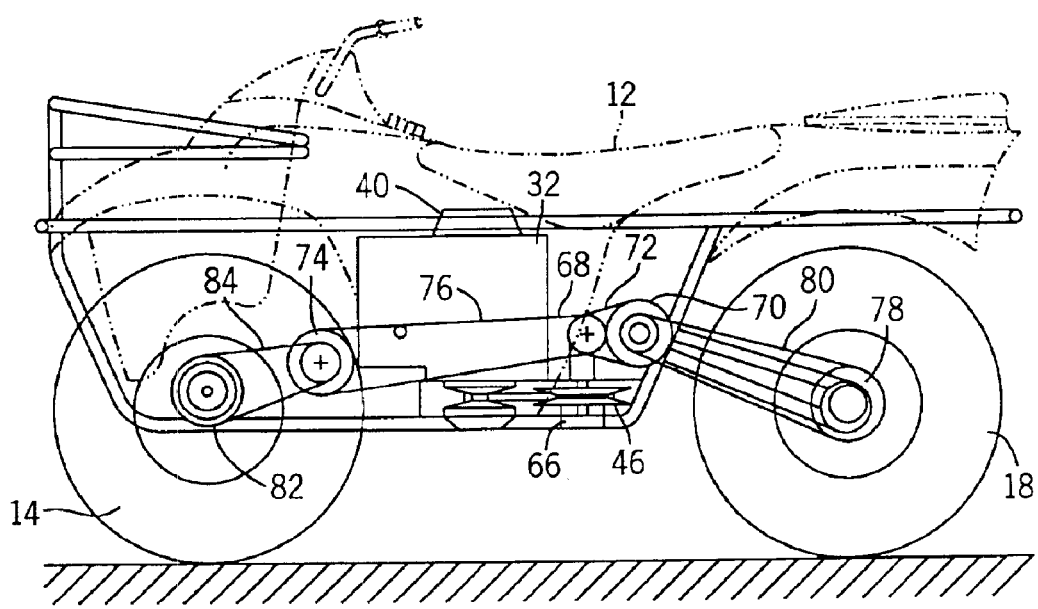
Figure 5:
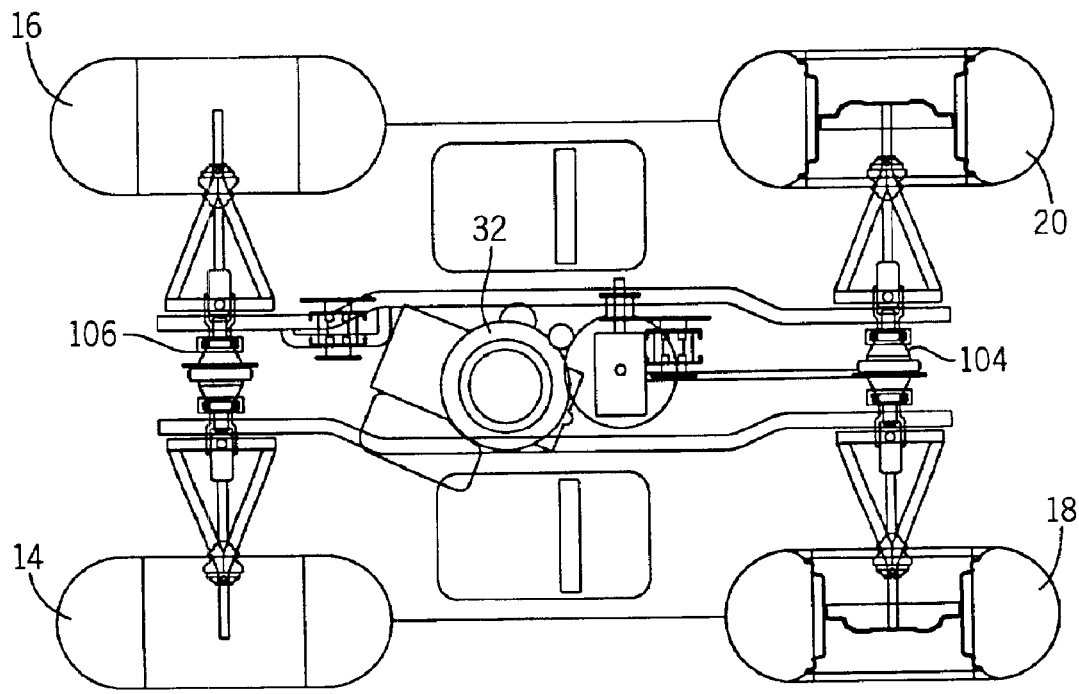
Figure 6:
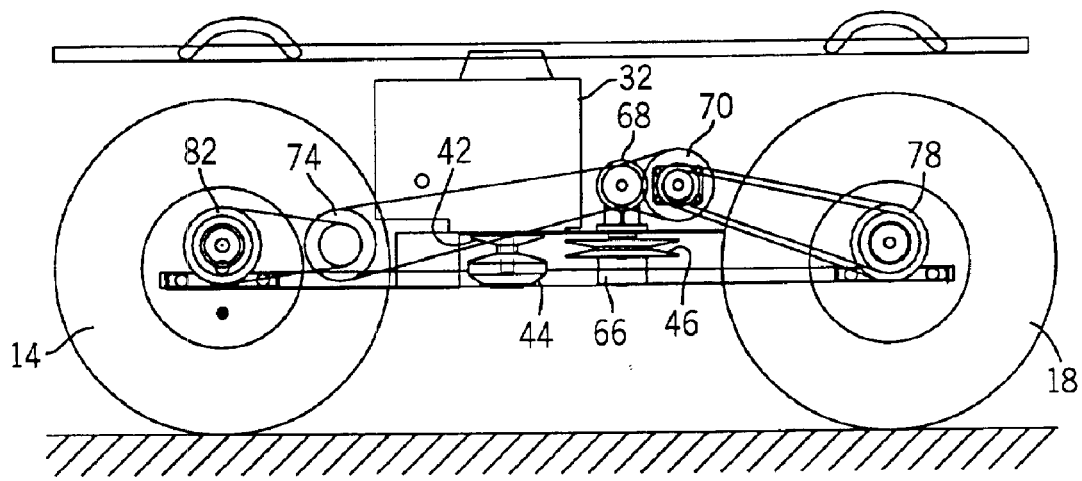
Figure 7:
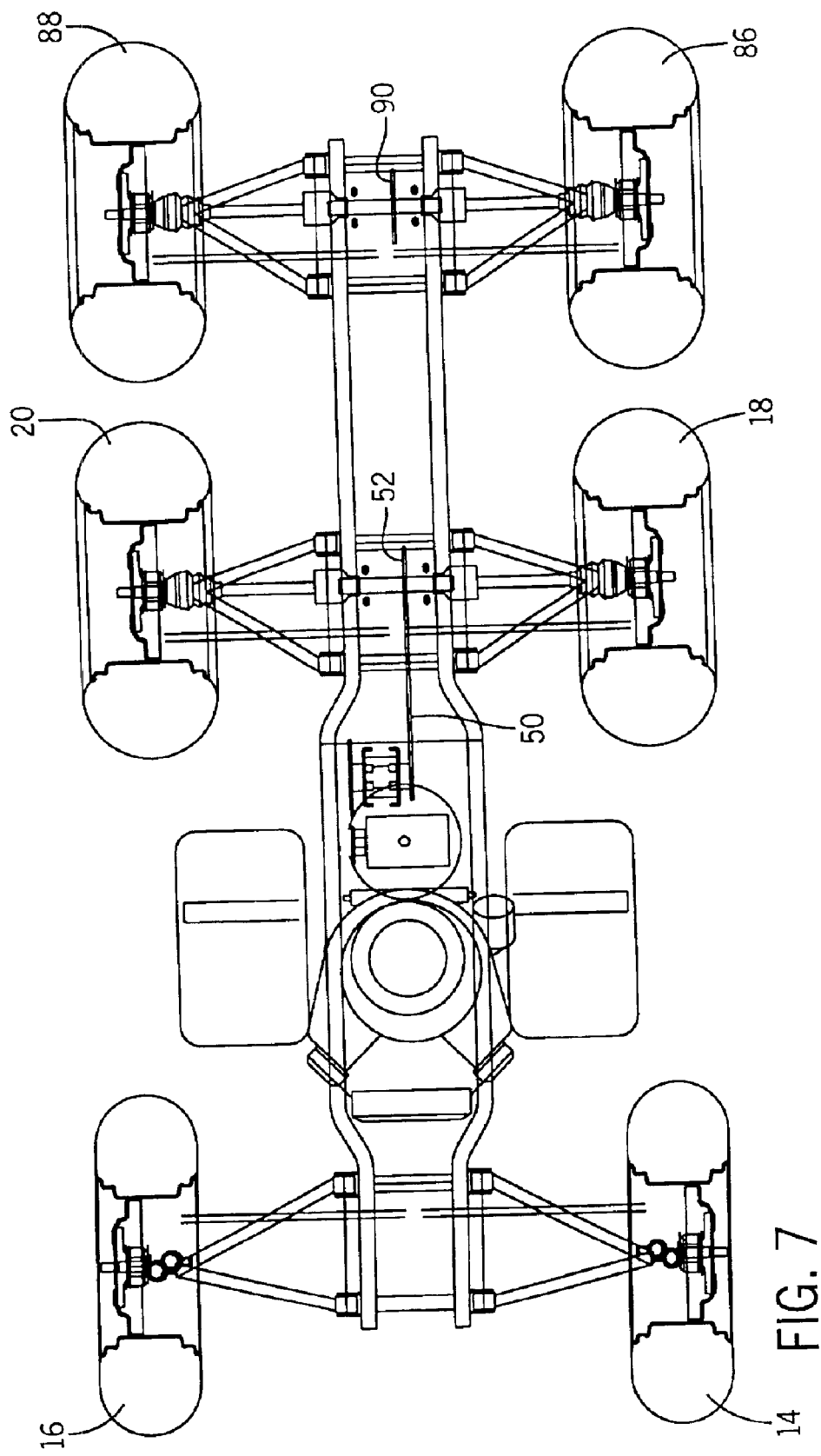
Figure 8:
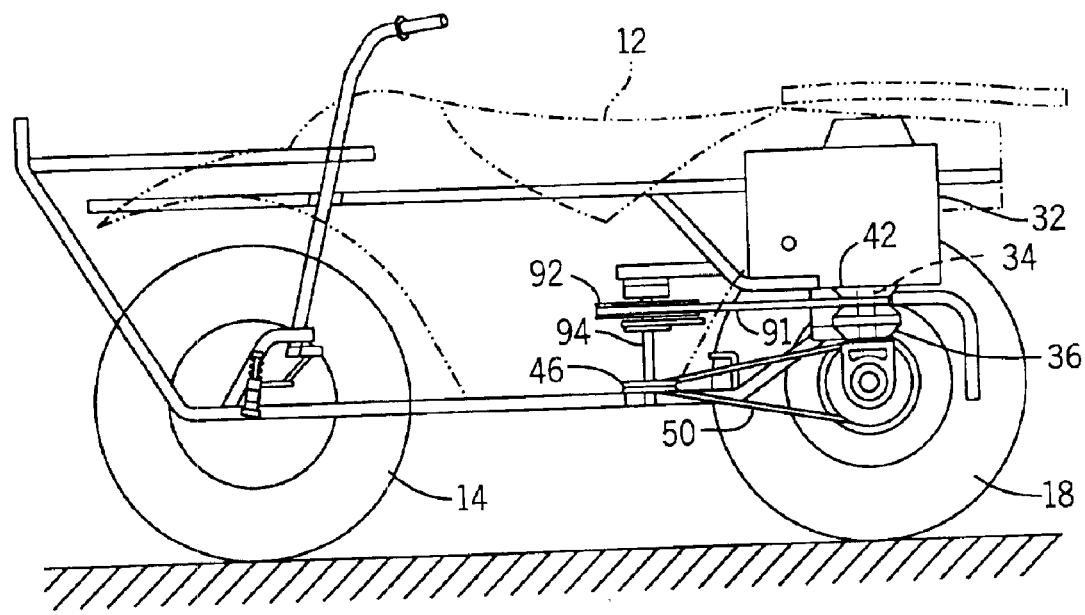
Figure 9:
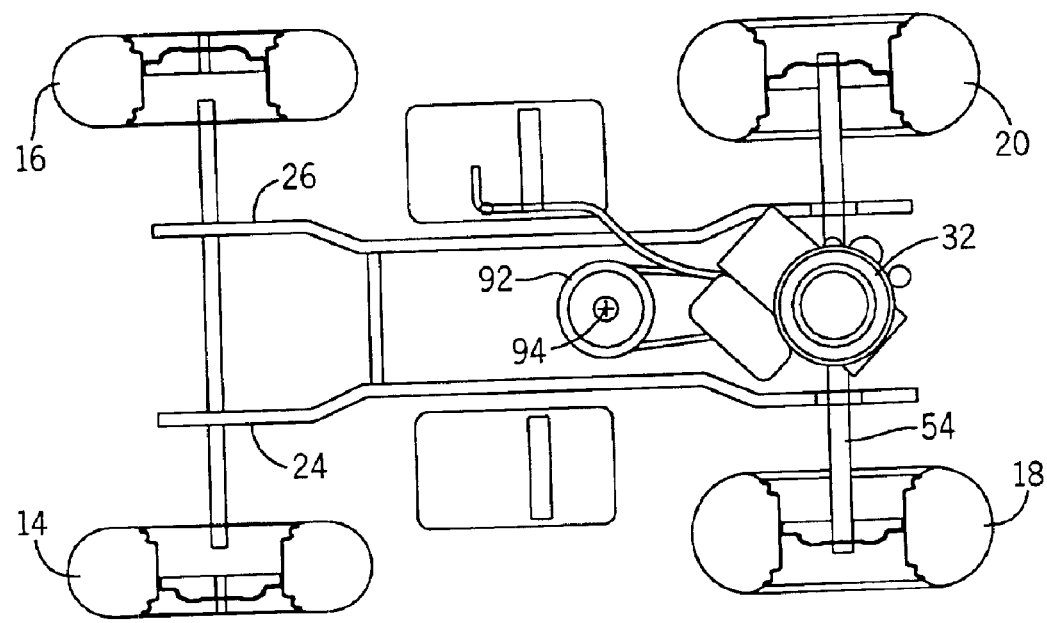
Figure 10:
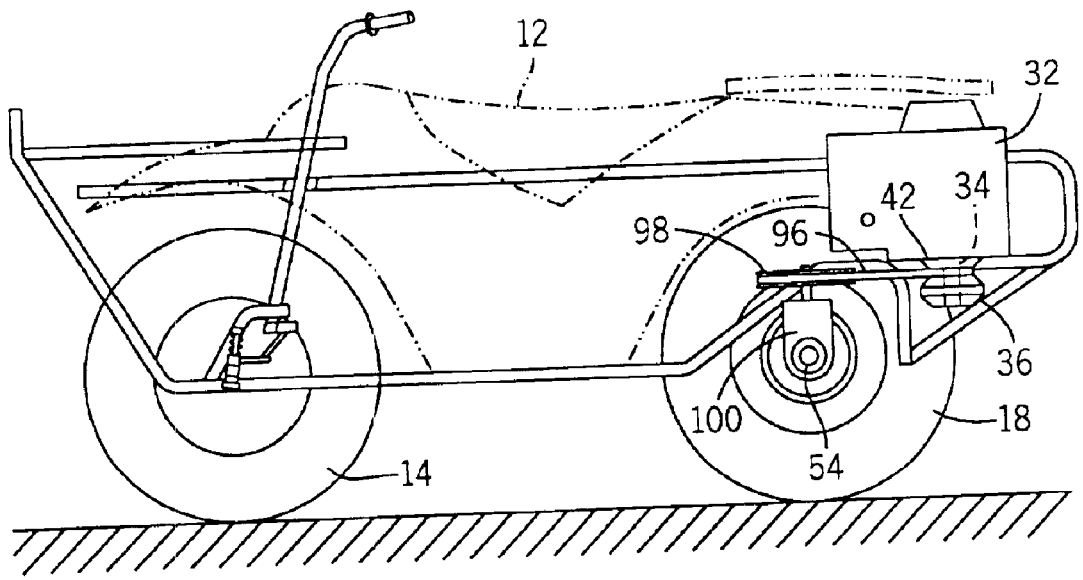
Figure 11:
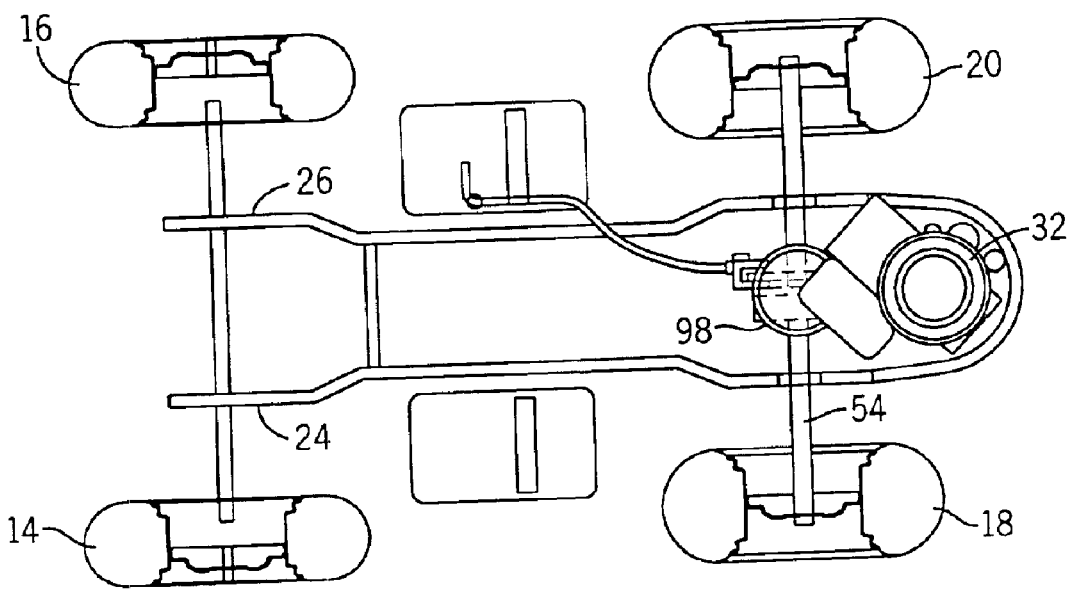

FIGS. 3 and 4 are similar to FIGS. 1 and 2 and show how the parent invention enables a four wheel drive ATV, with a live rear axle and independently suspended front wheels. Secondary pulley 46 drives a 90° transmission 66, which is known in the art, which in turn drives pulley 68 which drives pulley 70 via belt 72 and which drives pulley 74 via belt 76. Pulley 70 drives rear transmission 78 via belt 80, to in turn drive rear wheel tires 18, 20. Pulley 74 drives front transmission 82 via belt 84 to drive front wheel tires 14, 16. FIGS. 5 and 6 illustrate how the parent invention enables a four wheel ATV with independent rear wheels and independent front wheels. FIG. 7 illustrates how the parent invention further enables a six wheel ATV, with additional rear wheel tires 86, 88. If these latter wheels are also to be drive wheels, then an additional drive belt is connected from pulley 52 or 78 to rear pulley 90 or a transmission. If a six wheel drive vehicle is desired, then an additional front drive pulley and belt are provided, as in FIGS. 3–6. FIGS. 8 and 9 show an ATV similar to that of FIGS. 1 and 2, but with engine 32 and its vertical crankshaft 34 directly over rear axle 54, wherein power take-off drive member 36 and primary pulley 42 driving drive belt 91 to drive pulley 92 on vertical shaft 94 which drives pulley 46 which drives rear wheel tires 18 and 20 by V-belt 50 as above. FIGS. 10 and 11 show an ATV similar to FIGS. 1 and 2, but with engine 32 and its vertical crankshaft 34 rearward of rear axle 54, with power take-off drive member 36 and primary pulley 42 driving drive belt 96 to drive pulley 98 driving a 90° transmission 100 to drive rear axle 54. In various embodiments, two drive wheels may be connected and driven through a differential, for example, 102, FIG. 3, 104, 106, FIG. 6.

Present Invention

FIG. 12 shows a vehicle drivetrain 110 for mounting to a vehicle, for example at vehicle frame rails such as 112, 114, on shock and vibration absorbing pads 116, FIG. 24, on frame rail flanges 118 and secured by bolts 120. The vehicle may be an ATV as above, with frame rails 112, 114 corresponding to above noted rails 24, 26, respectively. Drivetrain 110 includes an engine 122, comparable to engine 32, having a vertical crankshaft 124, FIG. 14, comparable to above noted vertical crankshaft 34, and providing a PTO, power take-off shaft. A first transmission 126, FIG. 13, is below engine 122 and is driven by vertical crankshaft 124 of the engine. A second transmission 128 is above first transmission 126 and horizontally adjacent engine 122. Second transmission 128 has an input shaft 130, FIG. 14, driven by first transmission 126, and has an output shaft 132 providing vehicle propulsion, to be described. The drivetrain propels the vehicle in a forward direction, which is leftward in FIGS. 12–15. Second transmission 128 is aft of engine 22 and has the noted vertical input shaft 130 aft of the vertical crankshaft 124, and has the noted horizontal output shaft 132 aft of vertical input shaft 130, and driven thereby, to be described. Each of engine 122 and second transmission 128 are mounted to first transmission 126 at an upper surface 134 thereof, FIG. 13, such that shafts 124 and 130 extend vertically and in parallel above first transmission 126. A power transfer device 136, to be described, is driven by second transmission 128 to transfer power to propel the vehicle. In one embodiment, the power transfer device has a pair of driveshafts 138, 140 driven in torque balancing counter-rotation, with aft or rear driveshaft 138 providing vehicle propulsion, e.g. by connection through a standard differential to the rear wheels, and with forward shaft 140 also providing vehicle propulsion by driving the front wheels and/or providing power to drive an accessory or implement mounted to the vehicle or to drive an electrical generator or any other use where it is desired to transfer power from a driven rotary shaft.

In preferred form, first transmission 126 is a constant velocity clutch continuously variable transmission, CVT, which is known in the prior art, for example U.S. Pat. Nos. 3,939,720, 6,095,937, incorporated herein by reference. CVT 126 has a first pulley 142, FIG. 14, driven by shaft 124, a second pulley 144 driving input shaft 130 of second transmission 128, and a belt 146 extending around the pulleys and driving second pulley 144 from first pulley 142. The pulleys rotate in a horizontal plane. A CVT mounting case 148 houses pulleys 142 and 144. Engine 122 and second transmission 128, FIG. 13, are each mounted to CVT mounting case 148 by respective bolts at respective first and second mounting attachment locations 150 and 152 precisely spaced and aligned to provide precise spacing of the centerlines of shafts 124 and 130 and precise alignment of such shafts in parallelism. This is significant in a CVT to provide consistent clutch engagement speed and maximally effective shift ratios. This is also important for improved belt life. Both the precise centerline to centerline spacing of the shafts and the precise parallel alignment of the shafts is significant. As is known, as engine speed increases, roller cranks 154, FIG. 14, move outwardly by centrifugal force and upwardly along cam surface 156, to in turn move lower pulley sheave 158 upwardly toward upper pulley sheave 160 to close the gap therebetween such that belt 146 moves radially outwardly in pulley 142 and radially inwardly in pulley 144 as upper sheave 162 of the latter moves upwardly away from lower sheave 164 and against the bias of spring 166, such that teeth 168 on sheave 162 engage teeth 170 of flywheel 172 to in turn rotate shaft 130. This is standard CVT operation.

Second transmission 128 is preferably a 90° gear transmission preferably provided by a dog clutch, which is known in the prior art, for example U.S. Pat. Nos. 4,118,996, 4,630,719, 4,679,682, 4,869,121, 4,952,181, 6,062,360, incorporated herein by reference. Input shaft 130 has a beveled pinion gear 174 driving beveled driven gears 176, 178 in counter-rotation, and having a clutch 180 shiftable left-right in FIG. 14 between gears 176 and 178 by shift linkage 182 to rotate shaft 184 either clockwise or counterclockwise depending on which of gears 176 and 178 is engaged, to selectively provide forward or reverse, all as is standard. Shaft 184 has high and low gears 186 and 188, respectively, driving high and low driven gears 190 and 192 on shaft 132 having left-right slidable clutch 194 thereon for selecting which gear to engage.

As noted above, output shaft 132 drives power transfer device 136, FIGS. 13, 16–19. In the preferred embodiment, the power transfer device is a power transfer rotary drive member driven by shaft 132, including a drive gear 196, FIGS. 17, 18, on shaft 132 driving intermediate transfer gear 198 which drives driven gear 200 on driven shaft 138 which drives gear 202 on driven shaft 140. In an alternate embodiment, the power transfer rotary drive member is provided by a chain drive, FIG. 20, having chain 204 extending around sprocket gear 206 on shaft 132 and sprocket gear 208 on shaft 138, which sprocket 208 has a gear 210 driving gear 212 on shaft 140.

The transfer case 214, FIG. 13, houses the noted power transfer rotary drive member. The transfer case is mounted to at least one and preferably both of second transmission 128 and CVT mounting case 148 for enhanced rigidity of the combination of the CVT mounting case and components mounted thereto, namely engine 122, second transmission 128 and transfer case 214. This combination is further preferred for bearing drivetrain and load related stress. Driveshaft 138 is mounted to the transfer case in journaled relation at bearing 216. Driveshaft 140 is mounted to the transfer case in journaled relation at bearing 218, and is mounted to the CVT mounting case in journaled relation at bearing 220, FIG. 19. Driveshaft 140 may be connected to a further forwardly extending driveshaft 222 by a universal joint 224. The CVT mounting case includes a protective shroud 226 partially covering driveshaft 140.

The CVT mounting case is preferably a sealed case enclosing and protecting pulleys 142, 144 and belt 146 against the elements, including water. The case is provided by a rigid upper clamshell portion 228, FIG. 14, and a lower clamshell portion 230 bolted together as at bolts 232. The upper clamshell portion has an air inlet port 234 receiving cooling air through an air hose or tube 236 extending upwardly and having an air filter 238, FIG. 12, at the top thereof, or extending as shown at tube 236a, FIG. 25, to receive engine inlet air at 240.

Lower clamshell portion 230 of the CVT mounting case has an air outlet port 242, FIG. 21, and an air circuit duct 244 therein directing air from air inlet port 234 around pulleys 142, 144 and belt 146 for cooling same, and then to air outlet port 242. Lower clamshell portion 230 has a pair of upstanding walls 246 and 248 horizontally spaced from each other and defining a supply passage 250 therebetween extending from air inlet port 234 and directing cooling air to pulleys 142, 144 and belt 146. The pulleys are separated by a gap 252, FIG. 14, and supply passage 250 extends to an area 254 below such gap. Lower clamshell 230 has a deflector ramp 256 in supply passage 250 and deflecting cooling air upwardly to gap 252. A transfer duct 258, FIG. 21, has a portion 260 covering supply passage 250, and has an upper duct portion 262 extending from the lower clamshell portion upwardly into gap 252 between the pulleys and spaced laterally inwardly of belt 146, FIGS. 22, 23, and transferring cooling air from supply passage 250. In one embodiment, air tube 236a, FIG. 25, extends between a cooling fan 264 of the engine and air inlet port 234 and supplies cooling air from fan 264 to air inlet port 234. In another embodiment, pulley 142 has fins 266, FIG. 14, thereon, which provides a fan circulating cooling air from air inlet port 234 through the CVT mounting case to air outlet port 242 during rotation of pulley 142. Lower clamshell portion 230 has an outer peripheral sidewall 268, FIG. 21, defining a return passage 270 between sidewall 268 and upstanding walls 246, 248. Air outlet port 242 is through outer peripheral sidewall 268.

In a further embodiment, the CVT mounting case also houses a hydraulic pump 272, FIGS. 26, 27 driven by one of the pulleys, preferably pulley 142, by belt 274. Hydraulic pump 272 is forward of pulley 142. Hydraulic pump 272 is enclosed by the noted upper and lower clamshell portions of the CVT mounting case together with pulleys 142, 144. The hydraulic pump has input and output hydraulic lines 274, 276 extending through the CVT mounting case.

A significant aspect of the invention is that it provides a modular pre-assembled unit ready for drop-in mounting to a vehicle, and providing a drivetrain for the vehicle. This enables a simplified manufacturing method for installing drivetrain components in a vehicle, by mounting engine 122 and second transmission 128 to first transmission 126 as a self-contained pre-assembled modular unit, with the noted precise spacing of the centerlines of shafts 124 and 130 and the noted precise alignment of such shafts in parallelism, followed by drop-in mounting as a modular unit to the vehicle. Engine 122 and second transmission 128 are mounted to the CVT mounting case at the noted respective first and second mounting attachments 150 and 152 precisely spaced and aligned to provide precise spacing of the centerlines of shafts 124 and 130 and precise alignment of such shafts in parallelism in the pre-assembled modular unit. The pulleys are then mounted to such shafts, followed by mounting of lower clamshell portion 230 to upper clamshell portion 228, followed by the noted drop-in mounting to the vehicle, e.g. on vehicle frame rails 112, 114, for example at mounting flanges 118. In an alternate embodiment, lower clamshell portion 230 is omitted, to provide an unsealed CVT mounting case, and with cooling air merely being supplied from inlet 234 to the vicinity of pulleys 142, 144, and belt 146. CVT mounting case portion 228 still provides the noted desirable rigid mounting base and combination for engine 122, transmission 128, and transfer case 214, as well as the noted precise centerline to centerline spacing of shafts 124 and 130 and the noted precise parallelism of such shafts. In a further alternative, the CVT mounting case including at portion 228 can be provided by a split housing, one section for each of shafts 124 and 130, respectively, which split housing sections are then precisely mounted to each other and then to the vehicle to provide the noted precise spacing and parallelism. In a further embodiment, the modular unit provided by components 122, 126, 128, 136 may be rotated 90° about a vertical axis to a transverse position, providing a driven output shaft extending transversely and which may be used in a transverse driving arrangement for the vehicle such as shown in FIG. 6, or may be used to drive a gear train. In a further embodiment, the modular unit provided by components 122, 126, 128, 136 may be rotated 180° about a vertical axis, for example to provide front wheel drive.

FIG. 28 shows a further embodiment and uses like reference numerals from above where appropriate to facilitate understanding. The output of second transmission 128 drives a differential 280 propelling the vehicle at rear wheels 18, 20. Differential 280 is aft of transmission 128 and is on a rear axle 282 sprung by a pair of leaf springs 284, 286. Engine 122, first and second transmissions 126 and 128 and power transfer device 136 form the noted modular unit. Leaf springs 284, 286 have forward ends 288, 290, respectively, mounted to such modular unit, and rearward ends 292, 294, respectively, mounted to the vehicle at frame rails 112, 114, respectively. The modular unit has a forward portion 296 mounted to the vehicle such as at cross-over bar 298 connected to frame rails 112, 114 and extending laterally therebetween. This provides a three-point mounting system consisting of the noted forward ends 288, 290 of the leaf springs and forward portion 296 of the modular unit. The combination of items 122, 126, 128, 136, 280, 282, 284, 286 forms a further unit mountable as a self-contained module to the vehicle.

FIG. 29 shows a further embodiment and uses like reference numerals from above where appropriate to facilitate understanding. The output of second transmission 128 also drives via shaft 140 a second differential 300 propelling the vehicle. Second differential 300 is forward of transmission 128 and is on front axle 302 and drives front wheels 14, 16. Engine 122, first and second transmissions 126 and 128 and power transfer device 136 form the noted modular unit, which modular unit is between first and second differentials 280 and 300 and supported thereby. The combination of items 122, 126, 128, 136, 280, 282, 140, 300, 302 forms a unit mountable as a self-contained module to the vehicle.

It is recognized that various equivalents, alternatives and modifications are possible within the scope of the appended claims which distinctly define the subject matter regarded as the invention.

What is claimed is:

1. A vehicle drivetrain comprising:

an engine having a PTO, power take-off, shaft;

a first transmission below said engine and driven by said PTO shaft;

a second transmission above said first transmission and horizontally adjacent said engine, said second transmission having an input driven by said first transmission, and an output providing vehicle propulsion;

wherein:

said PTO shaft extends vertically downwardly;

said second transmission has a downwardly extending vertical input shaft;

said first transmission is a constant velocity clutch continuously variable transmission, CVT, having a first pulley driven by said PTO shaft, a second pulley driving said input shaft of said second transmission, and a belt extending around said pulleys and driving said second pulley from said first pulley, said pulleys rotating in a horizontal plane;

and comprising:

a CVT mounting case housing said first and second pulleys, and wherein said engine and said second transmission are each mounted to said CVT mounting case at respective first and second mounting attachment locations precisely spaced and aligned to provide precise spacing of the centerlines of said PTO shaft and said input shaft of said second transmission and precise alignment of such shafts in parallelism;

a power transfer device driven by said output of said second transmission to transfer power to propel the vehicle;

wherein:

said power transfer device comprises a pair of drive shafts driven in torque balancing counter-rotation, at least one of said drive shafts providing vehicle propulsion; and said power transfer device comprises a power transfer rotary drive member driven by said output of said second transmission, and comprising a transfer case housing said power transfer rotary drive member, wherein said transfer case is mounted to said second transmission, the first of said drive shafts is mounted to said transfer case in journaled relation, and the second of said drive shafts is mounted to said CVT mounting case in journaled relation.

2. A vehicle drivetrain comprising:

an engine having a PTO, power take-off, shaft;

a first transmission below said engine and driven by said PTO shaft;

a second transmission above said first transmission and horizontally adjacent said engine, said second transmission having an input driven by said first transmission, and an output providing vehicle propulsion;

wherein:

said PTO shaft extends vertically downwardly;

said second transmission has a downwardly extending vertical input shaft;

said first transmission is a constant velocity clutch continuously variable transmission, CVT, having a first pulley driven by said PTO shaft, a second pulley driving said input shaft of said second transmission, and a belt extending around said pulleys and driving said second pulley from said first pulley, said pulleys rotating in a horizontal plane;

and comprising:

a CVT mounting case housing said first and second pulleys, and wherein said engine and said second transmission are each mounted to said CVT mounting case at respective first and second mounting attachment locations precisely spaced and aligned to provide precise spacing of the centerlines of said PTO shaft and said input shaft of said second transmission and precise alignment of such shafts in parallelism;

a power transfer device driven by said output of said second transmission to transfer power to propel the vehicle;

a transfer case housing said power transfer device and mounted to at least one of said second transmission and said CVT mounting case;

wherein said power transfer device comprises a power transfer rotary drive member driven by said output of said second transmission, wherein said transfer case is mounted to both said second transmission and said CVT mounting case for enhanced rigidity of the combination of said CVT mounting case and components mounted thereto, namely said engine, said second transmission and said transfer case mounted thereto.

3. A vehicle drivetrain comprising:

an engine having a PTO, power take-off, shaft;

a first transmission below said engine and driven by said PTO shaft;

a second transmission above said first transmission and horizontally adjacent said engine, said second transmission having an input driven by said first transmission, and an output providing vehicle propulsion;

wherein:

said PTO shaft extends vertically downwardly;

said second transmission has a downwardly extending vertical input shaft;

said first transmission is a constant velocity clutch continuously variable transmission, CVT, having a first pulley driven by said PTO shaft, a second pulley driving said input shaft of said second transmission, and a belt extending around said pulleys and driving said second pulley from said first pulley, said pulleys rotating in a horizontal plane;

and comprising a CVT mounting case housing said first and second pulleys, and wherein said engine and said second transmission are each mounted to said CVT mounting case at respective first and second mounting attachment locations precisely spaced and aligned to provide precise spacing of the centerlines of said PTO shaft and said input shaft of said second transmission and precise alignment of such shafts in parallelism;

wherein:

said CVT mounting case is a sealed case enclosing and protecting said pulleys and said belt against the elements, including water, and said CVT mounting case has an air inlet port, an air outlet port, and an air circuit duct therein directing air from said air inlet port around said pulleys and said belt for cooling same, and then to said air outlet port.

4. The vehicle drivetrain according to claim 3 wherein said CVT mounting case has a lower clamshell portion having a pair of upstanding walls horizontally spaced from each other and defining a supply passage therebetween extending from said air inlet port and directing cooling air to cool said pulleys and said belt.

5. The vehicle drivetrain according to claim 4 wherein said pulleys are separated by a gap, and said supply passage extends to an area below said gap.

6. The vehicle drivetrain according to claim 5 wherein said lower clamshell portion has a deflector ramp in said supply passage deflecting cooling air upwardly to said gap.

7. The vehicle drivetrain according to claim 5 comprising a transfer duct extending from said lower clamshell portion upwardly into said gap between said pulleys and spaced laterally inwardly of said belt and transferring cooling air from said supply passage.

8. The vehicle drivetrain according to claim 3 wherein said first pulley includes a fan circulating cooling air from said air inlet port to said air outlet port during rotation of said first pulley.

9. The vehicle drivetrain according to claim 4 wherein said lower clamshell portion has an outer peripheral sidewall defining a return passage between said sidewall and said upstanding walls, and wherein said air outlet port is through said outer peripheral sidewall.

10. A modular pre-assembled unit ready for drop-in mounting to a vehicle having a frame, and providing a drivetrain for the vehicle, comprising in combination:

an engine having a PTO, power take-off, shaft;

a first transmission below said engine and driven by said PTO shaft;

a second transmission above said first transmission and horizontally adjacent said engine and having an input driven by said first transmission;

shock and vibration absorbing pads mounting said first transmission to said vehicle frame;

said engine and said second transmission being mounted to said first transmission independently of said vehicle frame;

a power transfer device driven by said second transmission to transfer power to propel the vehicle;

wherein:

said PTO shaft extends downwardly and vertically;

said first transmission is a constant velocity clutch continuously variable transmission, CVT, having a first pulley driven by said PTO shaft, and a second pulley driven by a belt extending around said pulleys, said pulleys rotating in a horizontal plane;

said second transmission is a 90° gear transmission having a downwardly extending vertical input shaft driven by said second pulley, and a horizontal output shaft;

said power transfer device comprises a power transfer rotary drive member driven by said output shaft of said second transmission;

and comprising a CVT mounting case housing said first and second pulleys;

wherein:

said engine and said second transmission are each mounted to said CVT mounting case at respective first and second mounting attachments precisely spaced and aligned to provide precise spacing of the centerlines of said PTO shaft and said input shaft of said second transmission and precise alignment of said shafts in parallelism;

and comprising a transfer case housing said power transfer rotary drive member and mounted to at least one of said second transmission and said CVT mounting case.

* * * * *